United States Patent
Mello et al.

(10) Patent No.: US 12,482,010 B2
(45) Date of Patent: Nov. 25, 2025

(54) METHODS AND APPARATUS TO MONITOR CONSUMER BEHAVIOR ASSOCIATED WITH LOCATION-BASED WEB SERVICES

(71) Applicant: The Nielsen Company (US), LLC, New York, NY (US)

(72) Inventors: Brian Scott Mello, Oldsmar, FL (US); Arun Ramaswamy, Tampa, FL (US); David H. Wright, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/092,913

(22) Filed: Jan. 3, 2023

(65) Prior Publication Data
US 2023/0281645 A1    Sep. 7, 2023

Related U.S. Application Data

(63) Continuation of application No. 16/006,828, filed on Jun. 12, 2018, now abandoned, which is a
(Continued)

(51) Int. Cl.
*G06Q 30/0201*  (2023.01)
*G06Q 30/02*  (2023.01)
*G06Q 30/0251*  (2023.01)

(52) U.S. Cl.
CPC ......... *G06Q 30/0201* (2013.01); *G06Q 30/02* (2013.01); *G06Q 30/0256* (2013.01); *G06Q 30/0261* (2013.01); *G06Q 30/0267* (2013.01)

(58) Field of Classification Search
CPC ............... G06Q 30/0201; G06Q 30/02; G06Q 30/0256; G06Q 30/0261; G06Q 30/0267
See application file for complete search history.

(56) References Cited

U.S. PATENT DOCUMENTS 4,099,591 A    7/1978   Carr
4,973,952 A    11/1990  Malec et al.
(Continued)

FOREIGN PATENT DOCUMENTS

CA    2687348 A1    11/2008
EP    1045547 A2    10/2000
(Continued)

OTHER PUBLICATIONS

N. Hristova, Ad-me: wireless advertising adapted to the user location, device and emotions, Jan. 1, 2004, IEEE, 37th Annual Hawaii International Conference on System Sciences, 2004.*
(Continued)

*Primary Examiner* — Arthur Duran

(57) ABSTRACT

Example methods, apparatus, systems, and articles of manufacture to monitor consumer behavior associated with location-based web services are disclosed. Example disclosed apparatus include a receiver to receive a query from a mobile device including a query criterion and a first location identifier. Disclosed example apparatus further include a database to associate a second location identifier with an advertisement identifier indicative of an advertisement at a fixed location. Disclosed example apparatus also include an analyzer to credit the advertisement indicated by the advertisement identifier as having been exposed to a user of the mobile device in response to the first location identifier matching the second location identifier or the first location identifier being indicative of a first location within a distance of a second location indicated by the second location identifier.

20 Claims, 17 Drawing Sheets

Related U.S. Application Data continuation of application No. 11/877,433, filed on Oct. 23, 2007, now abandoned, which is a continuation of application No. PCT/US2007/072544, filed on Jun. 29, 2007.

(60) Provisional application No. 60/817,610, filed on Jun. 29, 2006.

(56) References Cited

U.S. PATENT DOCUMENTS

| | | |
|---|---|---|
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kansakoski et al. |
| 5,227,874 A | 7/1993 | Von Kohorn |
| 5,233,642 A | 8/1993 | Renton |
| 5,234,345 A | 8/1993 | Weinblatt |
| 5,241,534 A | 8/1993 | Omuro et al. |
| 5,287,266 A | 2/1994 | Malec et al. |
| 5,294,781 A | 3/1994 | Takahashi et al. |
| 5,319,638 A | 6/1994 | Lin |
| 5,444,745 A | 8/1995 | Ali-Vehmas |
| 5,461,390 A | 10/1995 | Hoshen |
| 5,483,276 A | 1/1996 | Brooks et al. |
| 5,640,002 A | 6/1997 | Ruppert et al. |
| 5,642,353 A | 6/1997 | Roy, III et al. |
| 5,686,888 A | 11/1997 | Welles, II et al. |
| 5,692,215 A | 11/1997 | Kutzik et al. |
| 5,740,035 A | 4/1998 | Cohen et al. |
| 5,768,680 A | 6/1998 | Thomas |
| 5,771,307 A | 6/1998 | Lu et al. |
| 5,794,210 A | 8/1998 | Goldhaber et al. |
| 5,799,154 A | 8/1998 | Kuriyan |
| 5,821,513 A | 10/1998 | O'Hagan et al. |
| 5,825,283 A | 10/1998 | Camhi |
| 5,848,129 A | 12/1998 | Baker |
| 5,867,110 A | 2/1999 | Naito et al. |
| 5,878,384 A | 3/1999 | Johnson et al. |
| 5,966,696 A | 10/1999 | Giraud |
| 5,978,657 A | 11/1999 | Suzuki |
| 5,991,735 A | 11/1999 | Gerace |
| 5,991,737 A | 11/1999 | Chen |
| 6,006,197 A | 12/1999 | D'Eon et al. |
| 6,091,956 A | 7/2000 | Hollenberg |
| 6,098,048 A | 8/2000 | Dashefsky et al. |
| 6,108,637 A | 8/2000 | Blumenau |
| 6,252,522 B1 | 6/2001 | Hampton et al. |
| 6,286,005 B1 | 9/2001 | Cannon |
| 6,353,929 B1 | 3/2002 | Houston |
| 6,370,629 B1 | 4/2002 | Hastings et al. |
| 6,386,450 B1 | 5/2002 | Ogasawara |
| 6,433,689 B1 | 8/2002 | Hovind et al. |
| 6,470,386 B1 | 10/2002 | Combar et al. |
| 6,493,649 B1 | 12/2002 | Jones et al. |
| 6,507,802 B1 | 1/2003 | Payton et al. |
| 6,546,257 B1 | 4/2003 | Stewart |
| 6,571,279 B1 | 5/2003 | Herz et al. |
| 6,581,025 B2 | 6/2003 | Lehman |
| 6,584,375 B2 | 6/2003 | Bancroft et al. |
| 6,587,835 B1 | 7/2003 | Treyz et al. |
| 6,606,605 B1 | 8/2003 | Kolls |
| 6,647,269 B2 | 11/2003 | Hendrey et al. |
| 6,720,876 B1 | 4/2004 | Burgess |
| 6,745,011 B1 | 6/2004 | Hendrickson et al. |
| 6,772,129 B2 | 8/2004 | Alvarez et al. |
| 6,774,797 B2 | 8/2004 | Freathy et al. |
| 6,837,436 B2 | 1/2005 | Swartz et al. |
| 6,912,507 B1 | 6/2005 | Phillips et al. |
| 6,940,403 B2 | 9/2005 | Kail, IV |
| 6,958,710 B2 | 10/2005 | Zhang et al. |
| 6,968,178 B2 | 11/2005 | Pradhan et al. |
| 6,970,131 B2 | 11/2005 | Percy et al. |
| 7,013,478 B1 | 3/2006 | Hendricks et al. |
| 7,069,238 B2 | 6/2006 | I'Anson et al. |
| 7,092,964 B1 | 8/2006 | Dougherty et al. |
| 7,127,261 B2 | 10/2006 | Van Erlach |
| 7,149,549 B1 | 12/2006 | Ortiz et al. |
| 7,155,210 B2 | 12/2006 | Benson |
| 7,206,647 B2 | 4/2007 | Kumar |
| 7,206,753 B2 | 4/2007 | Bancroft et al. |
| 7,227,498 B2 | 6/2007 | Soliman |
| 7,239,981 B2 | 7/2007 | Kolessar et al. |
| 7,272,982 B2 | 9/2007 | Neuhauser et al. |
| 7,295,108 B2 | 11/2007 | Corrado et al. |
| 7,408,460 B2 | 8/2008 | Crystal et al. |
| 7,420,464 B2 | 9/2008 | Fitzgerald et al. |
| 7,460,827 B2 | 12/2008 | Schuster et al. |
| 7,463,143 B2 | 12/2008 | Forr et al. |
| 7,466,241 B2 | 12/2008 | Lyle et al. |
| 7,471,987 B2 | 12/2008 | Crystal et al. |
| 7,587,732 B2 | 9/2009 | Wright et al. |
| 7,592,908 B2 | 9/2009 | Zhang et al. |
| 7,636,742 B1 | 12/2009 | Olavarrieta et al. |
| 7,710,267 B2 | 5/2010 | Toyokawa et al. |
| 8,098,152 B2 | 1/2012 | Zhang et al. |
| 8,185,351 B2 | 5/2012 | Crystal et al. |
| 8,229,469 B2 | 7/2012 | Zhang et al. |
| 2001/0037232 A1 | 11/2001 | Miller |
| 2001/0054066 A1 | 12/2001 | Spitzer |
| 2002/0002504 A1 | 1/2002 | Engel et al. |
| 2002/0004740 A1 | 1/2002 | Shotey et al. |
| 2002/0010757 A1 | 1/2002 | Granik et al. |
| 2002/0022488 A1 | 2/2002 | Srinivasan et al. |
| 2002/0025795 A1 | 2/2002 | Sharon et al. |
| 2002/0028665 A1 | 3/2002 | Mankovitz |
| 2002/0046104 A1 | 4/2002 | Kaddeche et al. |
| 2002/0059218 A1 | 5/2002 | August et al. |
| 2002/0077905 A1 | 6/2002 | Arndt et al. |
| 2002/0094787 A1 | 7/2002 | Avnet et al. |
| 2002/0097193 A1 | 7/2002 | Powers |
| 2002/0102993 A1* | 8/2002 | Hendrey ............ G06Q 30/0207 455/457 |
| 2002/0107027 A1 | 8/2002 | O'Neil |
| 2002/0111847 A1 | 8/2002 | Smith |
| 2002/0116266 A1 | 8/2002 | Marshall |
| 2002/0160758 A1 | 10/2002 | Pradhan et al. |
| 2003/0001796 A1 | 1/2003 | Wampler et al. |
| 2003/0054757 A1 | 3/2003 | Kolessar et al. |
| 2003/0055707 A1 | 3/2003 | Busche et al. |
| 2003/0097302 A1 | 5/2003 | Overhultz et al. |
| 2003/0105824 A1 | 6/2003 | Brechner et al. |
| 2003/0115098 A1 | 6/2003 | Kang |
| 2003/0119447 A1 | 6/2003 | Fisher et al. |
| 2003/0122708 A1 | 7/2003 | Percy et al. |
| 2003/0126013 A1 | 7/2003 | Shand |
| 2003/0149601 A1 | 8/2003 | Cabral |
| 2003/0171975 A1 | 9/2003 | Kirshenbaum et al. |
| 2003/0172375 A1 | 9/2003 | Shaw et al. |
| 2003/0220866 A1 | 11/2003 | Pisaris-Henderson et al. |
| 2003/0236712 A1 | 12/2003 | Antonucci et al. |
| 2004/0015399 A1 | 1/2004 | Maggio |
| 2004/0034561 A1 | 2/2004 | Smith |
| 2004/0073538 A1 | 4/2004 | Leishman et al. |
| 2004/0117239 A1 | 6/2004 | Mittal et al. |
| 2004/0220858 A1 | 11/2004 | Maggio |
| 2004/0225647 A1* | 11/2004 | Connelly ............ G06F 16/9532 |
| 2004/0260470 A1 | 12/2004 | Rast |
| 2005/0035857 A1 | 2/2005 | Zhang et al. |
| 2005/0049765 A1 | 3/2005 | Chetia et al. |
| 2005/0144632 A1 | 6/2005 | Mears et al. |
| 2005/0201826 A1 | 9/2005 | Zhang et al. |
| 2005/0203798 A1 | 9/2005 | Jensen et al. |
| 2005/0216509 A1 | 9/2005 | Kolessar et al. |
| 2005/0243784 A1 | 11/2005 | Fitzgerald et al. |
| 2005/0264430 A1 | 12/2005 | Zhang et al. |
| 2005/0289015 A1 | 12/2005 | Hunter et al. |
| 2006/0003732 A1 | 1/2006 | Neuhauser et al. |
| 2006/0004627 A1 | 1/2006 | Baluja |
| 2006/0041615 A1 | 2/2006 | Blank et al. |
| 2006/0053110 A1 | 3/2006 | McDonald et al. |
| 2006/0106674 A1 | 5/2006 | Muller |
| 2006/0111962 A1 | 5/2006 | Holsinger |
| 2006/0123014 A1 | 6/2006 | Ng |

(56) References Cited

U.S. PATENT DOCUMENTS

| | | | |
|---|---|---|---|
| 2006/0143082 A1* | 6/2006 | Ebert | G06Q 30/0276 705/14.72 |
| 2006/0270401 A1 | 11/2006 | Frangione et al. | |
| 2006/0287913 A1 | 12/2006 | Baluja | |
| 2006/0294225 A1 | 12/2006 | Grecco et al. | |
| 2007/0030824 A1 | 2/2007 | Ribaudo et al. | |
| 2007/0038516 A1 | 2/2007 | Apple et al. | |
| 2007/0073585 A1 | 3/2007 | Apple et al. | |
| 2007/0079331 A1 | 4/2007 | Datta et al. | |
| 2007/0088801 A1 | 4/2007 | Evkovitz et al. | |
| 2007/0093296 A1 | 4/2007 | Asher et al. | |
| 2007/0136122 A1 | 6/2007 | Diederiks | |
| 2007/0150353 A1 | 6/2007 | Krassner et al. | |
| 2007/0192168 A1 | 8/2007 | Van Luchene | |
| 2007/0214041 A1 | 9/2007 | Patel et al. | |
| 2007/0266395 A1* | 11/2007 | Lee | H04N 21/43615 348/E7.054 |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0004748 A1 | 1/2008 | Butler et al. | |
| 2008/0004951 A1 | 1/2008 | Huang et al. | |
| 2008/0052219 A1 | 2/2008 | Sandholm et al. | |
| 2008/0059988 A1* | 3/2008 | Lee | H04N 21/44218 725/9 |
| 2008/0077502 A1 | 3/2008 | Boyd | |
| 2008/0086356 A1 | 4/2008 | Glassman et al. | |
| 2008/0086533 A1 | 4/2008 | Neuhauser et al. | |
| 2008/0091087 A1 | 4/2008 | Neuhauser et al. | |
| 2008/0126420 A1 | 5/2008 | Wright et al. | |
| 2008/0133291 A1 | 6/2008 | Nasser et al. | |
| 2008/0140479 A1 | 6/2008 | Mello et al. | |
| 2008/0177695 A1 | 7/2008 | Nasser et al. | |
| 2008/0191934 A1 | 8/2008 | Baker et al. | |
| 2008/0243573 A1 | 10/2008 | Nasser et al. | |
| 2008/0243590 A1 | 10/2008 | Rich | |
| 2009/0063283 A1 | 3/2009 | Kusumoto et al. | |
| 2009/0070797 A1* | 3/2009 | Ramaswamy | H04N 21/4524 725/10 |
| 2009/0164284 A1 | 6/2009 | Koiso et al. | |
| 2009/0171767 A1 | 7/2009 | Kolessar | |
| 2009/0292587 A1 | 11/2009 | Fitzgerald | |
| 2010/0293221 A1 | 11/2010 | Sidman et al. | |
| 2011/0218864 A1 | 9/2011 | Pentz et al. | |
| 2012/0245978 A1 | 9/2012 | Jain et al. | |

FOREIGN PATENT DOCUMENTS

| | | |
|---|---|---|
| EP | 1326185 A1 | 7/2003 |
| EP | 1744276 A1 | 1/2007 |
| JP | H118585 A | 1/1999 |
| JP | H11259558 A | 9/1999 |
| JP | 2000209578 A | 7/2000 |
| JP | 2000307530 A | 11/2000 |
| JP | 2005086308 A | 3/2005 |
| JP | 2008197266 A | 8/2008 |
| WO | 9831114 | 7/1998 |
| WO | 200215086 | 2/2002 |
| WO | 2006015188 A2 | 2/2006 |
| WO | 2006015339 A2 | 2/2006 |
| WO | 2007044356 A2 | 4/2007 |
| WO | 2008003089 A2 | 1/2008 |
| WO | 2008118119 A1 | 10/2008 |

OTHER PUBLICATIONS

"First Office Action," The State Intellectual Property Office of China, issued in Chinese application No. 200780021656.X on Jan. 19, 2011 (3 pages).

Aaker, et al., "Marketing Research," John Wiley & Sons, Inc., 2001 (56 pages).

Azondekon et al., "Service Selection in Networks Based on Proximity Confirmation Using Infrared", International Conference on Telecommunications (ICT), Beijing, 2002, (5 Pages).

Bahl et al., "A Software System for Locating Mobile Users: Design, Evaluation, and Lessons," Feb. 2000 (13 Pages).

Battiti et al., "Location-Aware Computing: A Neural Network Model for Determining Location in Wireless Lans," Department of Information and Communication Technology, University of Trento, Feb. 2002 (17 pages).

Clark, Julie, "Shopping with detectives: customer tracking takes the mystery out of store design (The Digital Store)," Display & Design Ideas, vol. 14, No. 5, p. 48(1), May 2002 (2 pages).

Dunnett et al., "An Evaluation of Cinema Advertising Effectiveness," Marketing Bulletin, 1996, 7, 58-66, Research Note 2 (7 pages).

Extended European Search Report received in EP Application No. 07799199.0, mailed on Aug. 20, 2012, 6 pages.

Handy et al., "Lessons Learned from Developing a Bluetooth Multiplayer-Game," Institute of Applied Microelectronics and Computer Science, University of Rostock, 2nd International Conference on Pervasive Computing, Workshop on Gaming Applications in Ubiquitous Computing Environments, Wien, Osterreich, Apr. 18-23, 2004 (7 pages).

International Preliminary Report on Patentability received in PCT Application No. PCT/US2007/072544, issued on Jan. 6, 2009, 4 pages.

International Search Report and Written opinion received in PCT Application No. PCT/US2007/072544, mailed on Aug. 22, 2008, 4 pages.

Nandan et al., "AdTorrent: Digital Billboards for Vehicular Networks," In IEEEIACM International Workshop on Vehicle-to-Vehicle Communications, 2005 (9 pages).

Probst, Joshua James, "How a Customers First Impression Impacts Sales Effectiveness in an Automotive Retail Facility with Correlation to the Purchasing Decision," The Graduate College, University of Wisconsin-Stout, Jan. 2004 (47 pages).

State Intellectual Property Office of China, "Decision of Rejection," in Chinese Application No. 200780021656.X, issued on Jul. 23, 2012, 9 pages.

The State Intellectual Property Office of the People's Republic of China, "Notice on the Second Office Action," issued on Feb. 14, 2012, in Chinese application No. 200780021656.X, 8 pages.

Turley et al., "The Impact and Effectiveness of Advertisements in a Sports Arena," Journal of Services Marketing, vol. 14, No. 4, 2000, pp. 323-336 (14 pages).

United States Patent and Trademark Office, "Final Office Action" issued inconnection with U.S. Appl. No. 11/877,433, on Aug. 18, 2014, 18 pages.

United States Patent and Trademark Office, "Final Office Action" issued inconnection with U.S. Appl. No. 11/877,433, on Mar. 12, 2018, 12 pages.

United States Patent and Trademark Office, "Final Office Action" issued inconnection with U.S. Appl. No. 11/877,433, on Sep. 21, 2016, 24 pages.

United States Patent and Trademark Office, "Non-Final Office Action" issued inconnection with U.S. Appl. No. 11/877,433, on Apr. 4, 2014, 19 pages.

United States Patent and Trademark Office, "Non-Final Office Action" issued inconnection with U.S. Appl. No. 11/877,433, on Jun. 8, 2016, 35 pages.

United States Patent and Trademark Office, "Non-Final Office Action" issued inconnection with U.S. Appl. No. 11/877,433, on Nov. 16, 2017, 13 pages.

Wagner, David, "Global Positioning Systems for Personal Travel Surveys, Lexington Area Travel Data Collection Test," Sep. 15, 1997, (92 pages).

(56) References Cited

OTHER PUBLICATIONS

Yeung et al. "A Comparative Study on Location Tracking Strategies in Cellular Mobile Radio Systems," Global Telecommunications Conference, 1995, Globecom '95, IEEE, Nov. 14, 1995, pp. 22-28 vol. 1, (4 pages).

\* cited by examiner

METHODS AND APPARATUS TO MONITOR CONSUMER BEHAVIOR ASSOCIATED WITH LOCATION-BASED WEB SERVICES

RELATED APPLICATIONS

This patent arises from a continuation of U.S. patent application Ser. No. 16/006,828, filed Jun. 12, 2018, which is a continuation of U.S. patent application Ser. No. 11/877,433, filed Oct. 23, 2007, which is a continuation of PCT Application PCT/US2007/072544, filed Jun. 29, 2007, which is a continuation of U.S. Provisional Patent Application No. 60/817,610, filed Jun. 29, 2006. U.S. patent application Ser. No. 16/008,828, U.S. patent application Ser. No. 11/877,433, PCT Application PCT/US2007/072544, and U.S. Provisional Patent Application No. 60/817,610 are hereby incorporated herein by reference in their entirety.

FIELD OF THE DISCLOSURE

The present disclosure relates generally to media monitoring and, more particularly, to methods and apparatus to monitor consumer behavior associated with location-based web services.

BACKGROUND

Advertisers, retail establishments, product manufacturers, service providers, and other types of businesses are often interested in the behaviors of consumers related to their exposure to advertising and/or other informational media to better market their products or services. Business often use advertising or other information or promotional material to draw attention and interest to their products or services. Web-based technology also offers businesses the ability to make information about their products or services available on the Internet. People wishing to learn more about particular products or services can retrieve information via the Internet using, for example, search engines, or other Internet-enabled query-based applications.

Although businesses know that advertisements and other promotional information has the effect of influencing people to make purchasing decisions, the influential power of such advertisements and promotional information cannot be readily assessed by merely publicizing the advertisements and/or other information. A traditional technique for determining the effectiveness of an advertising campaign involves monitoring the sales quantities of the advertised product or service before and/or during the implementation of the advertising campaign. Another traditional technique for determining the effectiveness of an advertising campaign involves selecting a panel of consumers to observe various advertisements within a controlled environment and subsequently asking the consumers whether the advertisements would have influenced them to make purchases.

DETAILED DESCRIPTION

Although the following discloses example methods, apparatus, and systems including, among other components, software executed on hardware, it should be noted that such methods, apparatus, and systems are merely illustrative and should not be considered as limiting. For example, it is contemplated that any or all of the hardware and software components described herein could be embodied exclusively in hardware, exclusively in software, exclusively in firmware, or in any combination of hardware, firmware, and/or software. Accordingly, while the following describes example methods, apparatus, and systems, persons having ordinary skill in the art will readily appreciate that the examples provided are not the only way to implement such methods, apparatus, and/or systems.

Figure 1:
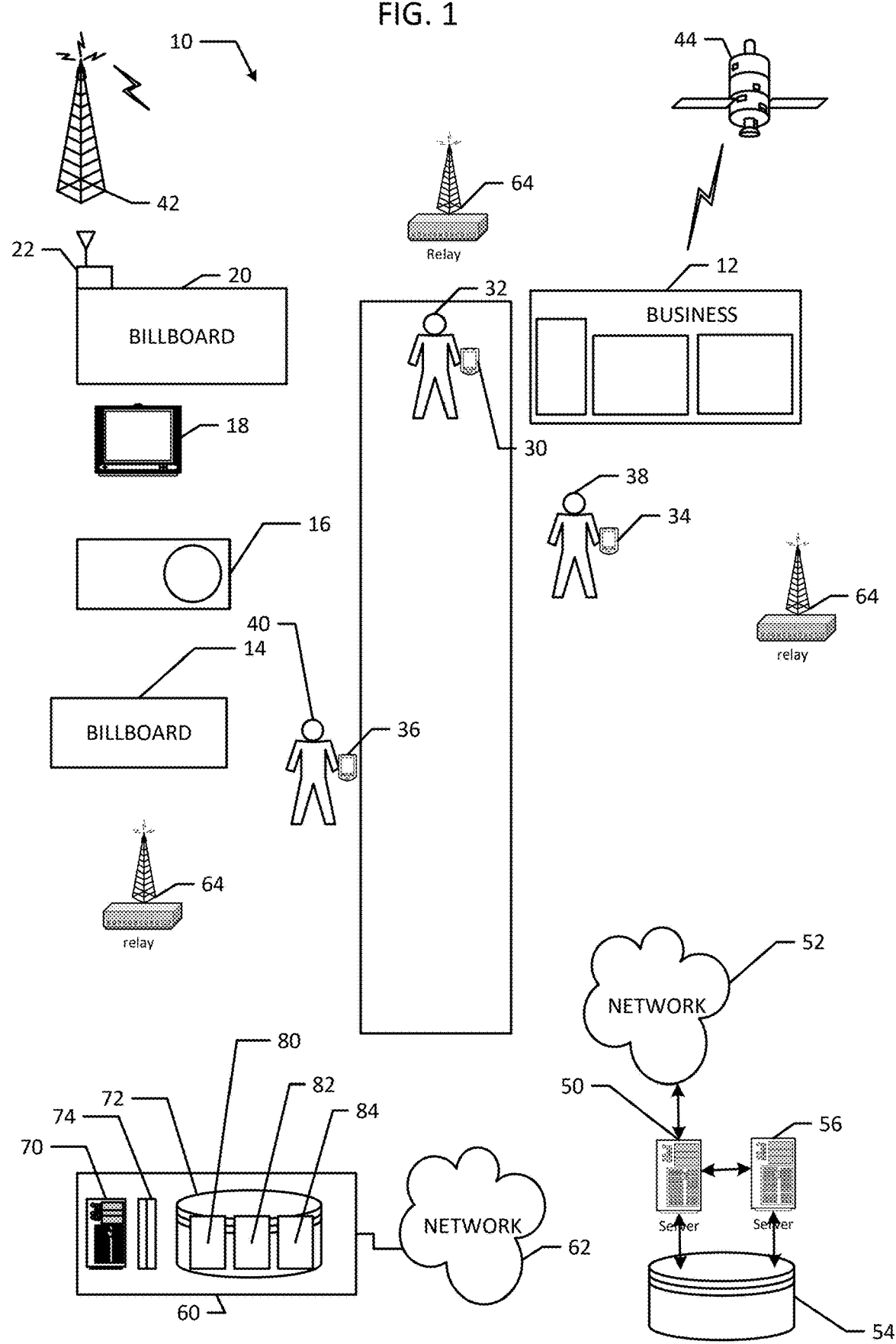
FIG. 1 illustrates an example system for collecting location data and providing web services to a monitored individual to monitor consumer behavior and measure effectiveness of advertising media and other information related to products, services, and/or retail establishments.

Turning to FIG. 1, for purposes of discussion the example methods and apparatus are described herein with respect to an example geographic area 10 including indoor and outdoor regions. However, the example methods and apparatus described herein may be used in any area or environment.

Information about a monitored individual's behavior may be determined/estimated using location information and/or motion information measured using a personal portable meter (PPM). Location information may include, for example, geographic area coordinates, global position coordinates, local area position coordinates, relative position coordinates, or any other type of location indication information that, when analyzed, may be used to determine the location of a person (e.g., a monitored individual) and/or the movements of a person from one location to another. Location information may also include distances between a person and a media source, such as, for example, a billboard, a print display (e.g., a poster), a video presentation device, an audio presentation device, etc. As described in greater detail below, location information may be collected, obtained, generated, etc. using any suitable location detection device(s), location detection system(s), and/or location detection technique(s). Specifically, the location detection devices described below may be worn or otherwise carried by a person or monitored person and/or may be part of the PPM.

Media monitoring information may include any information associated with media that is exposed to and/or consumed (e.g., viewed, listened to, interacted with, etc.) by a monitored person. Media presentations may include, for example, a television program, a radio program, movies, songs, advertisements, Internet information, and/or any other video information, audio information, still image information, and/or computer information to which a person may be exposed. Media monitoring information may be generated based on, for example, audio codes, signatures (e.g., a representation of any characteristic of monitored audio such as, for example, a characteristic of a program signal), radio frequency (RF) codes, and/or any other codes, information, or identifiers that may be extracted from and/or otherwise associated with a media presentation to which a monitored person is exposed. As described in greater detail below, media monitoring information may be collected, generated, obtained, etc. using any suitable media consumption detection device and/or any suitable media consumption detection technique. U.S. patent application Ser. No. 11/877,433 entitled, "METHODS AND APPARATUS TO MONITOR CONSUMER BEHAVIOR ASSOCIATED WITH LOCATION-BASED WEB SERVICES," is hereby incorporated by reference in its entirety. International Patent Application Serial No. PCT/US2007/72544, entitled "METHODS AND APPARATUS TO MONITOR CONSUMER BEHAVIOR ASSOCIATED WITH LOCATION-BASED WEB SERVICES," is hereby incorporated by reference in its entirety. U.S. Provisional Patent Application Ser. No. 60/817,610, entitled "Methods and apparatus for location-based media metering and web services," is hereby incorporated by reference in its entirety.

The example geographic area 10, in which the example methods and apparatus described herein may be implemented, includes an example business 12, which may sell products and/or services. The example geographic area 10 also includes various media that may be used to present advertisements or other information (e.g., product/services information, entertainment audio/video, etc.). In particular, the example geographic area 10 includes a billboard 14, an audio device 16, which may play or present audio advertising, and a video device 18, which may present video advertising. In the illustrated example, the audio device 16 may be implemented using a stationary audio device or system (e.g., a stationary stereo, a stationary audio playback device, a kiosk, etc.) configured to present audio advertisements and/or other types of audio information, and the video device 18 may be implemented using a stationary video device or system (e.g., a stationary television, a stationary video monitor, a kiosk, etc.) to present video advertisements and/or other types of video information. In the illustrated example, the media 14, 16, and 18 are used to present advertisements or product/services information external to the PPM's 30, 34, and 36 at fixed geographic locations so that any person that moves or walks within proximity of the media 14, 16, and 18 may be exposed to the advertisements or information.

In the illustrated example, a billboard 20 is provided with a radio frequency (RF) transmitter/receiver 22 to detect a PPM and/or be detected by a PPM. The RF transmitter 22 may be configured to emit location information indicative of the location of the billboard 20 and/or an advertisement identifier indicative of an advertisement presented by the billboard 20. Additionally or alternatively, the RF transmitter/receiver 22 can be configured to receive location and/or identification information from a PPM. In some example implementations, RF transceivers substantially similar or identical to the RF transmitter/receiver 22 may be provided to other media (e.g., the billboard 14, the audio device 16, and the video device 18).

The example geographic area 10 of FIG. 1 also includes an example PPM 30 worn and/or carried by a monitored person 32. Additional example PPM's 34 and 36 are carried by other monitored persons 38 and 40 in the geographic area 10 to increase the amount of data collected such as, for example, data associated with actions (e.g., queries, retail establishment visitations, purchases, etc.) of users (e.g., the persons 32, 38, and 40) related to exposure to media (e.g., the media 14, 16, 18, and 20). The accuracy of the analyses described herein may be increased by increasing the quantity of participating monitored persons assigned to PPM's. In some example implementations, participating monitored persons may be selected based on advertising and/or business objectives such as, for example, a desire to meter people within a particular demographic group or target market group. The example PPM 30 may operate inside and/or outside structures such as the business 12, and may employ one or more communication techniques and/or communication systems including, but not limited to, systems to communicate with a location system such as an RF transceiver tower 42 and/or a positioning satellite 44.

As described below, the example PPM 30 includes a location-based web service application that allows a monitored person (e.g., the monitored person 32) to obtain web-based information associated with their location. The PPM 30 receives web-based data from a web server 50 via a network 52, which in this example is the Internet. The web server 50 is coupled to a location database 54 and an application server 56, which enables the web server 50 to return locality specific information from the location database 54 to inquiries or queries made to the location-based web service application by the monitored person 32.

In the illustrated example, the PPM 30 is communicatively coupled to a central facility 60 via a network 62 to allow data transfer from the PPM 30. The network 62 may be implemented using any suitable communication interface including, for example, a telephone system, a cable system, a satellite system, a cellular communication system, AC power lines, a network, the Internet, etc. The central facility 60 of the illustrated example is communicatively coupled to other monitored sites such as the billboard 20 and/or broadcast sites that transmit programming and/or advertising to the audio device 16 and/or the video device 18. The central facility 60 may obtain media exposure data, consumption data, media monitoring data, location data, motion data, and/or any other monitoring data that are collected by the media monitoring devices such as, for example, the PPM 30. In the illustrated example, the PPM 30 may transmit data to a local relay device 64 which, in turn, transmits data to the central facility 60 to extend the range of the examined or monitored geographic area. The example system 10 may be provided with multiple local relay devices 64 that serve as access points for the PPM 30 and other devices to the network 62 and the central facility 60.

In the illustrated example, the central facility 60 includes a server 70 (i.e., a central processor system) and a database 72. The server 70 may be implemented using, for example, a processor system similar or identical to the example processor system 1712 depicted in FIG. 17 that is configured to store data collected from the PPM's in the database 72 and/or to analyze the collected data. The database 72 may be implemented using any suitable memory and/or data storage apparatus and technique(s). The database 72 of the illustrated example includes a PPM location file 80, which stores data relating to locations tracked by the PPM's such as the PPM 30, a media location file 82, and a web event use file 84. The media location file 82 stores the geographic location of each media presentation device or structure such as the billboards 16 and 20, the audio device 16 and the video device 18 in association with identifiers corresponding to those media presentation devices or structures. The web event use file 84 records all uses by the monitored persons 32, 38, and 40 of the location-based web service applications on the PPM's 30, 34, and 36.

The central facility 60 of the illustrated example also includes an analysis server 74 (e.g., an analyzer). The analysis server 74 allows an interested party such as a media monitoring entity or business to analyze collected data stored in the database 72. In the illustrated example, the analysis server 74 is configured to perform analysis such as correlations (e.g., identifying relationships or associations) between monitored persons, locations, advertisements, inquiries made via location-based information applications, retail establishments visited by the monitored persons, and/or purchases of the monitored persons. The operations of the analysis server 74 are described below.

Location information and/or motion information may be continuously collected in indoor environments and/or outdoor environments via, for example, the example PPM 30 that may be carried or worn by a monitored person (e.g., the monitored person 32) as shown in FIG. 1. The example PPM 30, discussed in further detail in connection with FIG. 2, may be implemented as a standalone device and/or integrated or jointly configured with another communication device such as, for example, a mobile telephone (e.g., a cordless telephone or a cellular-type telephone), a portable audio device (e.g., an IPOD® by Apple Computer, Inc.), a portable digital communicator, and/or a personal digital assistant (PDA).

Figure 2:
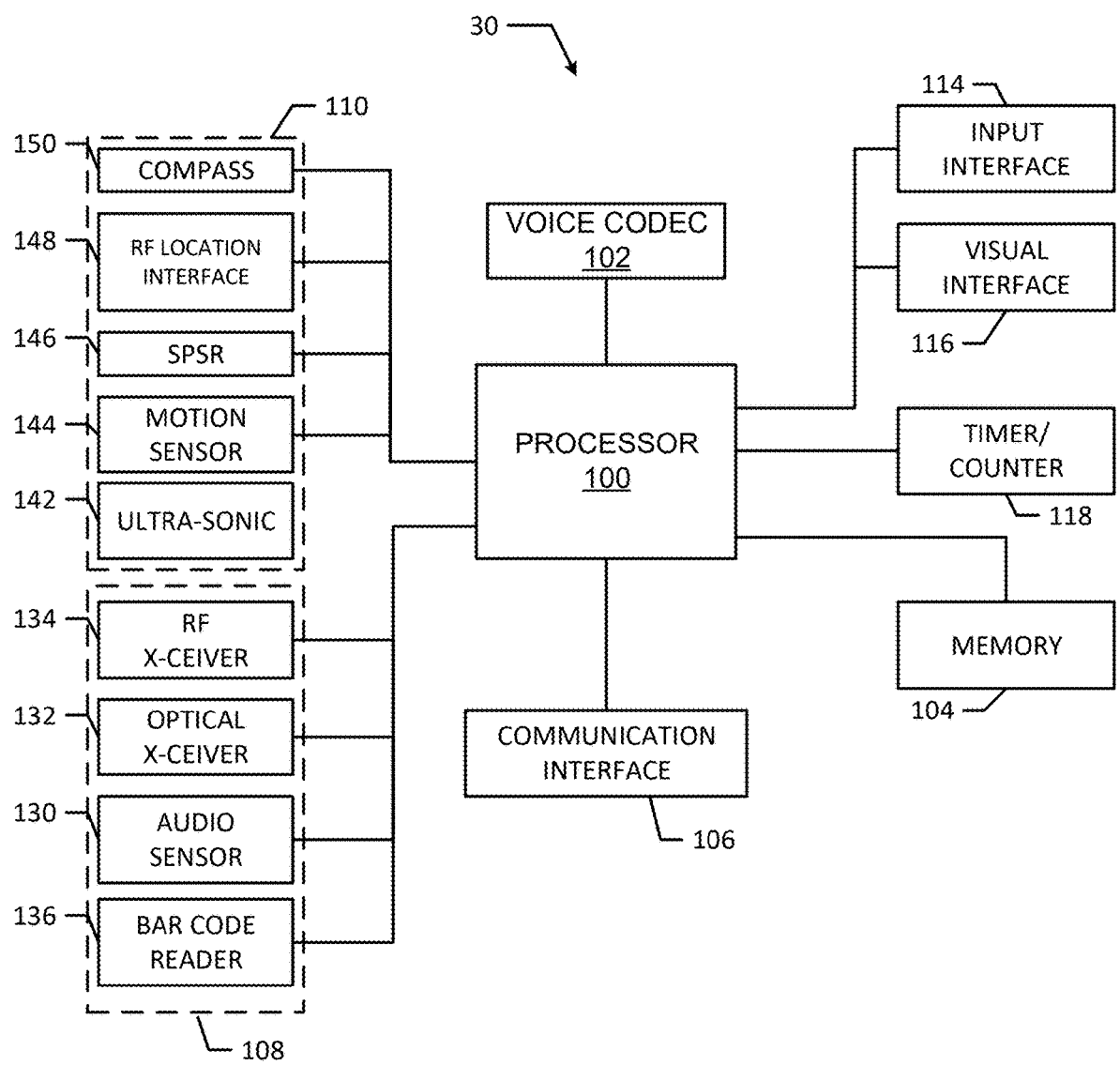
FIG. 2 is a block diagram of an example personal portable meter (PPM) device of FIG. 1.

FIG. 2 is a detailed block diagram of an example implementation of the PPM 30 of FIG. 1. As discussed above, the PPM 30 may be used to monitor the use of a location-based web service application by a monitored person (e.g., the monitored person 32 of FIG. 1). It may also be used to collect location information and/or motion information associated with the use of the location-based web application. In general, the PPM 30 includes electronic components configured to detect and/or collect media monitoring information, location information, and/or motion information, and to communicate the information to the central facility 60 of FIG. 1 for subsequent analyses. As shown in FIG. 2, the PPM 30 includes a processor 100, a voice coder/decoder (CODEC) 102, a memory 104, a communication interface 106, a plurality of media monitoring sensors 108, a plurality of location and motion sensors 110, an input interface 114, a visual interface 116 and a timer/counter 118, all of which are communicatively coupled as shown.

The processor 100 may be any processor suitable for controlling the PPM 30. The processor 100 of the illustrated example is responsible for managing and/or processing a location-based web service application and/or collecting, monitoring data related to detected media exposure, media consumption, media presentations, meter location, and/or meter motion. For example, the processor 100 may be implemented using a general purpose processor, a digital signal processor, or any combination thereof. The processor 100 may be configured to perform and control one or more operations and/or features of the PPM 30 such as, for example, setting the PPM 30 in different operating modes, controlling a sampling frequency for collecting media monitoring information, compressing collected information (e.g., collected tuning information, collected location information, and/or collected motion information), managing communication operations with other processor systems (e.g., the central facility 60 of FIG. 1), selecting location information systems (e.g., the RF transceiver tower 42, the positioning satellite 44, and/or the relay devices 64), and executing location-based web service applications.

The memory 104 may be used to store collected media monitoring information, program instructions (e.g., software, firmware, etc.), program data (e.g., location information, motion information, etc.), and/or any other data or information required to operate the PPM 30 and/or to implement the example methods and apparatus described herein. For example, after acquiring location information, motion information, and/or media monitoring information, the processor 100 may timestamp the acquired information and store the timestamped information in the memory 104. The processor 100 may also store information indicative of use of a location-based web service application, timestamp the acquired information, and store the timestamped information in the memory 104. The memory 104 may be implemented using any suitable volatile and/or non-volatile memory such as, for example, a random access memory (RAM), a read-only memory (ROM), a flash memory device, a hard drive, an optical storage medium, etc. In addition, the memory 104 may be any removable or non-removable storage medium.

The communication interface 106 may be used to communicate information between the PPM 30 and other systems including, for example, the central facility 60, and/or the web location server 50 of FIG. 1. The communication interface 106 may be implemented using any type of suitable wired or wireless transmitter, receiver, or transceiver such as, for example, a Bluetooth® compliant transceiver, an IEEE 802.11 (i.e., Wi-Fi®) compliant transceiver, a cellular communications transceiver, an optical communications transceiver, a network port, a universal serial bus (USB) port, etc.

The media monitoring sensors 108 of the illustrated example include an audio sensor 130, an optical transceiver 132, an RF transceiver 134, and a bar code reader 136. The example PPM 30, via the audio sensor 130, the optical sensor 132, the RF transceiver 134 and/or the bar code reader 136 may be configured to observe or monitor the environment in which the monitored person 32 is located to detect advertisements, products, media presentations, and/or signals associated with the advertisements, the products, and/or the media presentations. When one of the sensors 108 detects an advertisement, a product, or a media presentation, the example PPM 30 logs or stores a representation (e.g., a signature, a code, etc.) of the detected advertisement, product, or media presentation and/or an identifier (e.g., a code) thereof in the memory 104, along with a timestamp indicative of the time at which the information was detected.

The audio sensor or transducer 130 may be, for example, a condenser microphone, a piezoelectric microphone or any other suitable transducer capable of converting audio information into electrical information. The optical transceiver 132 may be, for example, a transmitter and receiver combination including a light sensor (e.g., a light sensitive diode, an IR sensor, a complimentary metal oxide semiconductor (CMOS) sensor array, a charge-coupled diode (CCD) sensor array, etc.) and a light emitter (e.g., a light emitting diode (LED), etc.). The RF transceiver 134 may be, for example, a Bluetooth® compliant transceiver, an IEEE 802.11 compliant transceiver, an ultrawideband RF receiver, and/or any other RF receiver and/or transceiver that detects signals from an example RF transceiver such as the RF transceiver 22 of the billboard 20 of FIG. 1. While the example PPM 30 of FIG. 1 includes the audio sensor 130, the optical transceiver 132, the RF transceiver 134, and the bar code reader 136, the example PPM 30 need not include all of the sensors 130, 132, 134, and 136. In some example implementations, the audio sensor 130 may be sufficient to detect audio and/or video information (e.g. audio and/or video advertisements) to generate and/or collect identification characteristics and/or identifiers, such as signatures and/or, if they are present, audio measurement codes which may be inserted for the purpose of audience measurement. Additionally, in some example implementations, the optical transceiver 132 may be sufficient to detect still picture and/or video information to generate and/or collect identification characteristics, such as signatures and/or, if present, video codes. However, because video monitoring generally requires a line of sight between the PPM 30 and the detected media, the example PPM 30 may be provided with the audio sensor 130 and the optical transceiver 132.

To detect location-related information and/or motion-related information, the processor 100 of the illustrated example is communicatively coupled to the location and motion sensors 110. The location and motion sensors 110 may include an ultrasonic transceiver 142, a motion sensor 144, a satellite positioning system (SPS) receiver 146, an RF location interface 148, and/or a compass 150. In some example implementations, the audio sensor 130 may also be configured to function as a location sensor by receiving ultrasonic signals from an ultrasonic source, such as an ultrasonic transmitter on the relay devices 64, on other portable units, and/or on other stationary units located throughout one or more areas.

Some of the location and motion sensors 110 may be configured to receive location-related information (e.g., encoded information, pluralities of fragmented information, etc.) and to perform any processing necessary to convert the received information to location information that indicates the location of the PPM 30. For example, the PPM 330 may generate location information using triangulation techniques by receiving RF signals from three or more RF transmitters (e.g., three or more of the relay devices 64 or the RF transceiver tower 42 of FIG. 1), and triangulating or processing the combination of RF signals. Some of the location and motion sensors 110 may be configured to process received location-related signals to generate location information, and others of the location and motion sensors 110 may be configured to communicate the location-related signals to the processor 100, and the processor 100 may be configured to process the received location-related signals using, for example, software and/or hardware processes to generate location information. In some example implementations, the location and motion sensors 110 may process the received information in combination with the processor 100 to generate the location information.

The ultrasonic transducer 142 may be used to enable the PPM 30 and/or the relay devices 64 to determine a location of the PPM 30. In some example implementations, the ultrasonic transducer 142 may be configured to work in combination with the RF location interface 148, the RF transceiver 134, and/or the optical transceiver 132 to determine a distance between the PPM 30 and a particular stationary unit such as the transceiver tower 42. For example, the PPM 30 may transmit an ultrasonic chirp and RF signal simultaneously. Because the ultrasonic chirp propagates to the transceiver tower 42 at the speed of sound, and the simultaneously transmitted RF chirp propagates at the speed of light, the signals reach the same transceiver tower 42 at different times (i.e., the RF chirp arrives before the ultrasonic chirp). The distance between the PPM 30 and the transceiver tower 42 may be calculated based on the distinct times of arrival, as described in further detail below.

The motion sensor 144 may be used to detect relatively small body movements of a monitored person (e.g., the monitored person 32). The motion sensor 144 may also generate motion information related to the body movements, and communicate the motion information to the processor 100. The motion sensor 144 may be implemented using any suitable motion detection device such as, for example, a mercury switch, a trembler, a piezo-gyroscope integrated circuit (IC), an accelerometer IC, etc.

The SPS receiver (SPSR) 146 may be implemented using, for example, a GPS receiver and may be configured to generate location information based on encoded GPS signals received from GPS satellites such as the positioning satellite 44 in FIG. 1. In general, the SPS receiver 146 may be used by the PPM 30 to collect location information in outdoor environments. The GPS data can be stored as latitude and longitudinal coordinates.

The RF location interface 148 may be implemented using a receiver and/or a transceiver and may be used to receive location-related signals and/or information from a location information system such as, for example, the RF transceiver tower 42 and/or the relay devices 64. For example, the RF location interface 148 may use transmission towers such as the RF transceiver towers 42 to determine the location of the PPM 30 using a method such as, for example, angle of arrival (AOA), time difference of arrival (TDOA), and/or enhanced observed time difference of arrival (EOTD). Additionally or alternatively, methods including, for example, advanced forward link trilateration (AFLT) or Enhanced Forward Link Trilateration (EFLT) may be used to determine the locations of the PPM 30.

The RF location interface 148 may also be configured to broadcast location-related information such as, for example, time-stamped PPM identification codes. The time-stamped PPM identification codes may be received by, for example, three or more of the relay devices such as the relay device 64, which may process the codes cooperatively using triangulation techniques to determine the location of the PPM 30. The relay devices 64 may communicate the received time-stamped PPM identification codes to the central facility 60 along with information relating to the times at which the codes were received by each of the relay devices 64. The central facility 60 may then determine the location of the PPM 30 based on this information.

The RF location interface 148 may be implemented using any suitable RF communication device such as, for example, a cellular communication transceiver, a Bluetooth® transceiver, an 802.11 transceiver, an ultra-wideband RF transceiver, etc. In addition, the RF location interface 148 may be implemented using only an RF receiver or only an RF transmitter. Examples of known location-based technologies that may be implemented in connection with the RF location interface 228 include an Ekahau Positioning Engine™ by Ekahau, Inc. of Saratoga, California and an ultrawideband positioning system by Ubisense, Ltd. of Cambridge, United Kingdom.

Another example technique that may be used to determine the location of the PPM 30 using the ultrasonic sensor 142 and the RF location interface 148 in FIG. 2 involves communications between the relay device 64 and the PPM 30. In particular, the relay device 64 is separated by a distance "x" from the PPM 30. The relay device 64 initiates a location determination process (distance determination) by emitting a chirp, which includes a simultaneous radio frequency (RF) chirp with an ultrasonic chirp. The relay device 64 may transmit the RF chirp with an RF location transceiver and transmit the ultrasonic chirp with an ultrasonic transducer. The RF chirp transmitted by the relay device 64 may further include an embedded relay device identifier associated with the relay device 64. RF signals (electromagnetic radiation) propagate at 186,282 miles per second, whereas the speed of sound propagates at a substantially slower speed of about 0.2057 miles per second. Because the RF chirp propagation time travels at the speed of light, the PPM 30 receives the RF chirp first and initiates the timer/counter 218. Accordingly, the PPM 30 is "armed" and waiting to detect the ultrasonic chirp via the ultrasonic sensor 142. Upon receipt of the ultrasonic chirp by the PPM 30, the PPM 30 stops the timer/counter 218 and calculates the distance between the relay device 64 and the PPM 30 as a function of the elapsed time and the known propagation rate of sound. Audio sampling rates of computers, PDA's, and other audio hardware typically exceeds 8000 samples per second. Such a sample rate yields a resolution of 0.125 milliseconds per sample, which is sufficient for purposes of monitored person distance determination.

The relay device 64 and PPM 30 may, additionally or alternatively, repeat the distance determination process any number of times to verify an accurate measurement. For example, five iterations of the distance determination process may be performed in which the PPM 30 calculates an average distance from the five samples. The average distance value is then transmitted to the relay unit 64 via an encoded RF signal. Still further, the PPM 30 may send the raw elapsed time data back to the relay device 64 rather than perform such calculations on the processor 100. Processing the raw data at the relay device 64 rather than at the PPM 30 allows the PPM 30 to consume less power for calculations and/or reduce the size requirements of the memory 104. The relay device 64 can then communicate the determined location information to the PPM 30.

If necessary, or if different degrees of accuracy are desired, adjustments to the calculation may be implemented to accommodate for variations in air temperature, ambient pressure, and/or atmospheric density. Such calculations are stored in the memory 104 of the PPM 30 and executed by the processor 100 to yield the distance "x." The PPM 30 can then generate location information based on the calculated distance and store the location information in the memory 104 for later communication to the central facility 60.

The compass 150 may be implemented using a magnetic field sensor, an electronic compass integrated circuit (IC), and/or any other suitable electronic circuit. In general, the compass 150 may be used to generate direction information, which may be useful in determining the direction in which a monitored person (e.g., the monitored person 32) is facing. The direction information may also be used to determine if a person is facing, for example, the billboard 20 so that when the PPM 30 receives an RF identification signal from the transceiver 22, corresponding to the billboard 20 in FIG. 1 and location information indicating that the monitored person 32 is in front of the billboard 20, the direction information from the compass 150 may be used to determine if the monitored person 32 is facing the billboard 20 and, thus, is exposed to the media. In this manner, the content of the billboard 20 may be credited appropriately for being viewed by or exposed to a monitored person.

An example positioning technology that may be used in combination with the compass 150, the motion sensor 144, and the SPS receiver 146 is the Dead-Reckoning Module (DRM®) produced and sold by Point Research Corporation of Santa Ana, California. The DRM® is configured to enable generation and/or collection of location information within buildings (e.g., a household, the business 12) and in outdoor environments. In general, when used outdoors, the DRM® may be configured to enable the SPSR 146 to use GPS technology to collect and/or generate location information. When used indoors, the DRM® uses, among other components, a compass (e.g., the compass 150) and an accelerometer (e.g., the motion sensor 144) to generate location information.

The PPM 30 may further include the visual interface 116, which may be used in combination with the input interface 114 to enter and retrieve information from the PPM 30. For example, the visual interface 116 may be implemented using a liquid crystal display (LCD) that, for example, displays detailed status information, location information, configuration information, calibration information, etc. The visual interface 116 may display an interface for the local web-based information application and allow the monitored person to view search results from queries submitted via the application.

The timer/counter 118 may be used to generate timer events that are communicated to the processor 100. Timer events may be used to, for example, wake-up the PPM 30 from a shut-down state, powered-down state, a power-saving mode state, etc. The timer/counter 118 may be configured to generate a timing event after a particular amount of time has elapsed or at a particular time of day. The amount of time or time of day may be set by, for example, configuring registers in the timer/counter 118. The timer/counter 118 may include a real-time clock or other time-tracking mechanism to generate timestamps that can be stored in association with location tracking data and query events indicative of queries submitted by users via the location-based web service application as discussed below.

The PPM 30 may be integrated with other functions such as a wireless phone that uses the voice coder/decoder 102 to code and decode voice signals and the RF transceiver 134 to send the voice signals over a wireless network for phone calls. Likewise, the processor 100 may run an Internet browser or other applications for use by the monitored person using the input interface 114 and the visual interface 116. It is to be understood that the components in FIG. 2 may be hardware, software and/or firmware and could, for example, be loaded or otherwise integrated into existing PDA's or wireless phones with existing components to perform the above-described functions.

The media monitoring information collected by the PPM's in the geographic area 10 (e.g., by the PPM 30) may be processed by the central facility 60 at a later time. The central facility 60 stores location data from the PPM's, as well as usage data from the location-based web application on the PPM 30. As discussed earlier, the central facility 60 may also monitor and store broadcast information, such as audio codes/signatures from radio and/or television programs.

The PPM 30 may be configured to substantially continuously generate, obtain, and/or collect media monitoring information, location information, and motion information. As described above, the PPM 30 may include one or more media monitoring sensors 108 used to detect media and to generate or collect media monitoring information or media-related data based on, for example, audio signals, visual signals, RF signals, infrared (IR) signals, ultrasonic signals, etc. In addition, the PPM 30 may include one or more location or positioning devices that enable the PPM 30 to collect location or position information from one or more location and motions sensors 110 and corresponding systems, and/or to send the collected location information to one or more location information systems. The example geographic area 10 includes one or more location information systems that may be used to communicate/receive location information to/from the PPM 30.

The PPM 30 may collect/generate and store media monitoring information (e.g., audience measurement codes (e.g., codes inserted to identify media, sometimes referred to as "ancillary codes"), signatures, etc.) associated with any media (e.g., video, audio, movies, music, still pictures, advertising, etc.) to which the monitored person 32 is exposed. For example, the PPM 30 may be configured to obtain codes (e.g., audio codes), generate or collect signatures, etc. that may be used to identify video programs (e.g., DVD movies, television programming, etc.), audio programs (e.g., CD audio, radio programming, etc.), and/or any other media. Using one or more media detection devices described above in connection with FIG. 2, the PPM 30 may collect media monitoring information associated with presented or delivered media to which the monitored person 32 may be exposed.

Additionally, the PPM 30 may be configured to receive codes (e.g., audio codes and/or RF codes) associated with other forms of media such as, for example, billboards or any other form of publicly viewable advertising or media. For example, each billboard (e.g., the billboard 20) may include an audio broadcasting device and/or an RF broadcasting device such as, for example, the transceiver 22 of FIG. 1, configured to emit a billboard code that uniquely identifies that billboard. If the PPM 30 is proximate to a billboard, the PPM 30 may obtain the billboard code as media monitoring information, thereby indicating that the monitored person 32 was exposed to the billboard. In addition, the PPM 30 may be configured to obtain direction information via, for example, the compass 150, and log the direction in which the monitored person 32 is facing or traveling so that subsequent data analyses may determine if the monitored person 32 was likely facing the billboard.

The RF transceiver tower 42 may be used in combination with any RF communication technology such as, for example, a cellular or mobile communication technology (e.g., GSM, CDMA, TDMA, AMPS, etc.). In some example configurations, the RF transceiver tower 42 may be configured to transmit or broadcast position information and/or any type of signal that may be used by the PPM 30 to generate location information. For example, the RF transceiver tower 42 may transmit information having geographic location information and time codes. More specifically, the RF transceiver tower 42 may be associated with a particular or unique set of geographic location coordinates (i.e., geographic location information), that define or indicate the location of the RF transceiver tower 42 within a global positioning grid. The time codes may be associated with a time at which a particular signal is transmitted by the RF transceiver tower 42.

The geographic location information and the time codes received from a plurality of RF transceiver towers may be used by the PPM 30 to perform triangulation processes to determine the location(s) of the PPM 30. Although the RF transceiver tower 42 is depicted as being located in an outdoor environment, the PPM 30 may include location technologies that communicate with the RF transceiver tower 42 when the PPM 30 is located within indoor environments (e.g., within the business 12) and/or outdoor environments.

The positioning satellite 44 may also be used to communicate location information to the PPM 30. For example, the positioning satellite 44 may be used to implement any satellite positioning system (SPS) such as, for example, the global positioning system (GPS) that continuously broadcasts position-related information. In this manner, the PPM 30 may receive the position-related information from the satellite 44 to determine movement information associated with the location(s) of the PPM 30.

Figure 3:
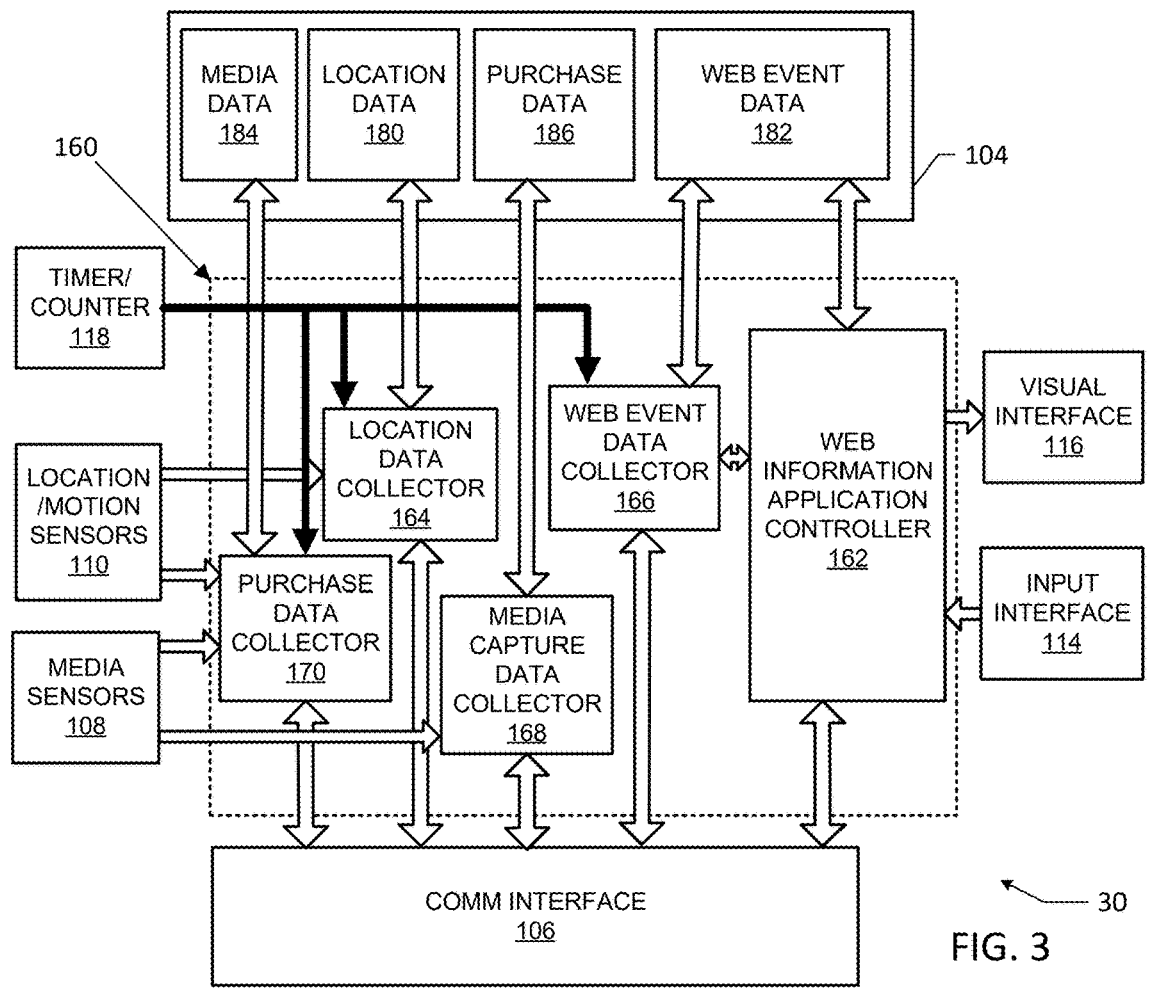
FIG. 3 is a more detailed block diagram of a portion of the example PPM of FIGS. 1 and 2.

FIG. 3 is a block diagram of an example apparatus 160 to implement the location data collection and web event data collection of the example PPM 30 of FIGS. 1 and 2. The apparatus 160 may be implemented using, for example, logic and/or other circuitry in communication or integral with the media monitoring sensors 108 and location and motion sensors 110 described above in connection with FIG. 2, and/or may be implemented using software and/or firmware executed by the processor 100 of FIG. 2. The apparatus 160 includes a web-based information application controller 162, a location data collector 164, a web event data collector 166, a media capture data collector 168, and a consumer purchase data collector 170. The web-based information application controller 162 is coupled to the input interface 114, the visual interface 116, and the communication interface 106. In this illustrated example, the web-based application controller 162 and the location data collector 164 are used to implement a location-based web services application. A location-based web services application enables a user of the PPM 30 to submit queries requesting information about products, services, retail establishments, etc., and the application communicates the requests along with corresponding location information indicative of the location at which the PPM 30 (and, thus, the monitored person 32) was located when the monitored person 32 submitted the query.

In the illustrated example, the web-based information application controller 162 presents a search window on the visual interface 116 that allows the monitored person 32 to enter search requests or queries including one or more query criteria (e.g., product search term(s), services search term(s), retail establishment search term(s), etc.) and/or location information such as an address, GPS coordinates, a zip code, area code, etc. The web-based information application controller 162 may be used to request information about a product or service including descriptive information or retail establishment names and/or addresses thereof of where the product or service is sold. Additionally, the web-based information application controller 162 may be used to request addresses of particular retail establishments nearest a location of the monitored person 32. In some example implementations, search terms or criteria provided by the monitored person may include bar code identification codes or RFID identification codes scanned by the monitored person 32 using the bar code reader 136 or the RF transceiver 134 of FIG. 2. For example, the person 32 may see a product and scan its bar code ID or RFID to request information.

The web-based information application controller 162 transmits requests or queries via the communication interface 106 to the web server 50 of FIG. 1. The web server 50 returns information responsive to the search request in, for example, a hypertext markup language (html) file and/or an extensible markup language (XML) file to the communication interface 106. In the illustrated example, the web-based information application controller 162 tailors answers to search requests based on the monitored person's current location. For example, if the monitored person 32 makes a query for restaurants, the web-based information application controller 162 prioritizes results in the immediate geographic area of the monitored person 32. The local web-based information application controller 162 may then display the results via the visual interface 116. Additionally or alternatively, the web server 50 may filter, arrange, and/or return search results based on the location of the monitored person 32.

The location data collector 164 is coupled to the location and motion sensors 110, the timer/counter 118, and the memory 104. The memory 104 stores a location data log file 180. The location data collector 164 collects/generates location information and stores an identification code for the PPM 30 and the location information along with corresponding timestamps in the location data log file 180.

The web event data collector 166 is coupled to the web-based information application controller 162 and the timer/counter 118. The web event data collector 166 records or tracks the use of the location-based web services application as well as results obtained through searches. The web event data collector 166 stores an identification code for the PPM 30, the web event data, and a corresponding timestamp from the timer/counter 118 in a web event data log file 182 stored in the memory 104. In the illustrated example, the location data collector 164 retrieves the data stored in the location data log file 180, the web event data collector 166 retrieves the data stored in the web event data log file 182, and the data collectors 164 and 166 periodically or aperiodically communicate the data via the communication interface 106 to the central facility 60.

In the illustrated example, the media data collector 168 is coupled to the media monitoring sensors 108, the location and motion sensors 110, the timer/counter 118, and the memory 104. The memory 104 stores a media data log file 184. In the illustrated example, after one or more of the media monitoring sensors 108 detects a media signal, the media data collector 168 can generate a signature and/or extract a code from the detected media signal. The media data collector 168 can then store the media code and/or signature in the media data log file 184. The media data collector 168 can be configured to periodically or aperiodically communicate the data in the media data log file 184 via the communication interface 106 to the central facility 60.

In the illustrated example, the consumer purchase data collector 170 is coupled to the location and motion sensors 110, the timer/counter 118, and the memory 104. The memory 104 stores a purchase data log file 186. In the illustrated example, the RF transceiver 134 and/or the bar code reader 136 can be configured to read product identifiers, service identifiers, and/or retail establishment identifier(s) and communicate the identifier(s) to the consumer purchase data collector 170. The consumer purchase data collector 170 can then store the identifier(s) in the purchase data log file 186 in association with corresponding timestamp(s) indicative of when purchase(s) were made and corresponding location information indicative of the location(s) at which the purchase(s) were made.

Figure 4:
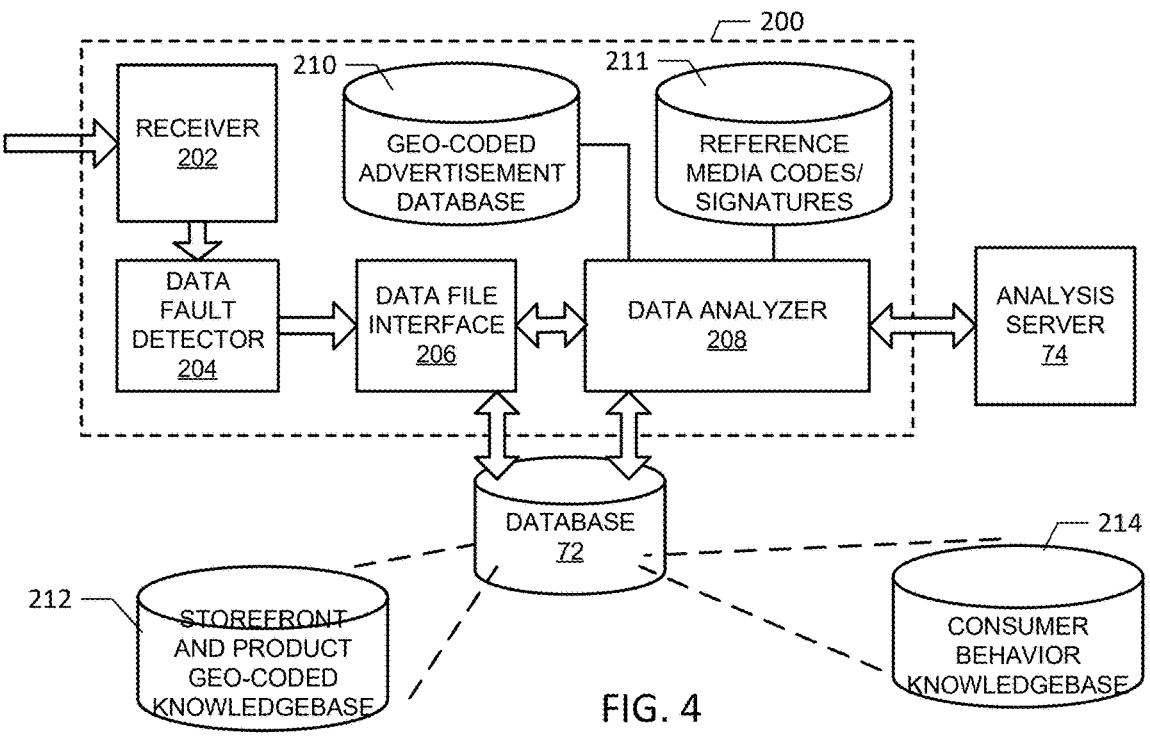
FIG. 4 is a block diagram of an example data analysis apparatus that may be used to analyze data collected by the example PPM of FIGS. 1-3.

FIG. 4 is a block diagram of an example apparatus 200 that may be used to collect location and media data (e.g., advertising data) from the PPM 30, other data devices, and the server 70 of FIG. 1 and analyze the collected data. The apparatus 200 may be implemented using, for example, logic and/or other circuitry in communication with or integral to the server 70, or may be implemented using software and/or firmware executed by the server 70. The apparatus 200 is communicatively coupled to the database 72 and the analysis server 74 described above in connection with FIG. 1. In some example implementations, the analysis server 74 may be the same server as the server 70.

In the illustrated example, the example apparatus 200 includes a receiver 202, a data fault detector 204, a data file interface 206, a data analyzer 208, a geo-coded advertisement database 210, and a reference media codes/signatures database 211. The receiver 202 is coupled to a communications interface of the server 70 to receive data from log files (e.g., the data log files 180, 182, 184, and 186 of FIG. 3) of PPM's (e.g., the PPM 30). The receiver 202 is configured to perform initial processing on the received data and to make the data available to the data fault detector 204. The data fault detector 204 performs one or more processes described below to determine the validity of the data entries from the data log files 180, 182, 184, and 186. The data file interface 206 creates files and stores/retrieves data in the files to facilitate data analysis by the data analyzer 208.

In the illustrated example, the data analyzer 208 is coupled to the geo-coded advertisement database 210, which is configured to store advertisement identifiers in association with respective location identifiers. The advertisement identifiers are indicative of or identify advertisements placed at geographic locations, and the location identifiers are indicative of the locations at which those advertisements are placed. The data analyzer 208 is configured to determine associations or correlations between queries or search requests, advertisements, retail establishments, and purchase data based on respective location information and timestamps. For example, the data analyzer 208 may retrieve a location identifier associated with a query from a data file created by the data file interface 206 and also retrieve advertisement and location identifiers from the geo-coded advertisement database 210 associated with advertisements to determine the advertisements to which a user (e.g., the monitored person 32 of FIG. 1) was proximately located when the monitored person 32 submitted the query or sometime before the monitored person 32 submitted the query. The analyzer 208 can also determine, based on search terms of the query, which advertisements are associated with the query and credit those advertisements as having been exposed to the monitored person 32 and/or credit the advertisements to indicate their effectiveness in influencing the user to request information about the advertised products, services, retail establishments, etc. In addition, the analyzer 208 can analyze path of travel information associated with the monitored person 32 based on received location information to determine whether the monitored person 32 visited any retail establishments, and to credit certain advertisements and/or query/search results as having effectively influenced the monitored person 32 to visit such retail establishments related to those advertisements and/or query/search results. In some example implementations, an advertisement and/or a query/search result is deemed to be related to a visited retail establishment if the advertisement or query/search result advertises or provides information about the retail establishment or a product offered by the retail establishment and, in some instances, if the advertised establishment was subsequently visited.

To determine associations or correlations between purchases and advertisement exposures and/or query/search results, the data analyzer 208 can analyze received purchase data indicative of purchases within a particular time frame of a user-submitted query or search request. If the data analyzer 208 determines that a particular purchase is related to an exposure to an advertisement or a query/search result, the data analyzer 208 credits the advertisement and/or the query/search result as having effectively influenced the monitored person 32 to make the purchase.

The reference media codes/signatures database 211 is configured to store advertisement identifiers in association with respective media representation information such as codes or signatures that are known to be associated with, correspond to, or that otherwise identify those advertisements. For example, the reference media codes/signatures database 211 can store reference audio codes or signatures that identify respective audio advertisements, reference video codes, or signatures that identify respective video advertisements, and/or RF codes or signatures that identify respective advertisements (e.g., the billboard 20 of FIG. 1) having RF transmitters (e.g., the RF transmitter 22 of FIG. 1) that emit codes or unique RF signals. The data analyzer 208 can compare codes or signatures collected by the PPM's 30, 34, and 36 (FIG. 1) to the known codes or signatures in the reference media codes/signatures database 211 to determine audio, video, or other stationary advertisements to which the monitored persons 32, 38, and 40 were exposed.

In addition, the data analyzer 208 can use the advertisement identifier information in the reference media codes/signatures database 211 in connection with the geo-coded advertisement database 210 to determine the locations at which the advertisements were presented.

In the illustrated example, the data analyzer 208 can retrieve information from the database 72 to perform analyses and can store analysis results in the database 72 for subsequent retrieval by a metering entity or a business interested in receiving the analysis results. In the illustrated example, the database 72 includes a storefront and product geo-coded knowledgebase 212 and a consumer behavior knowledgebase 214. The storefront and product geo-coded knowledgebase 212 stores retail establishment identifiers and product/service identifiers in association with respective location identifiers indicative of the locations of those retail establishments and products/services. In some example implementations, the data analyzer 208 can retrieve the associated identifiers from the storefront and product geo-coded knowledgebase 212 to determine whether a user visited a particular retail establishment and/or purchased a product or service at a particular retail establishment. The storefront and product geo-coded knowledgebase 212 can be setup and configured by a metering entity (e.g., a metering business implementing the example methods and apparatus described herein) upon initial system setup to associate location identifiers with respective retail establishments and/or products/services. The knowledgebase 212 is maintained thereafter to keep location identifier associations up to date. In some example implementations, the storefront and product geo-coded knowledgebase 212 is updated based on data collected by the PPM 30. For example, purchase data stored by the PPM 30 in association with location information may include a retail establishment name or identifier that the storefront and product geo-coded knowledgebase 212 can use to update location identifier associations and/or add new location identifier associations.

During or after some or all types of analyses, the data analyzer 208 can store behavior-related analysis results in the consumer behavior knowledgebase 214 to create data representative of persons' behaviors related to advertisements and query results. The behavior-related data stored in the consumer behavior knowledgebase 214 can be used to extrapolate buying trends, purchasing psychology, assess how influential certain query search results are on people, etc. Product manufacturers, retail establishments, service providers, advertisers or any other interested entity can use the consumer behavior knowledgebase 214 to determine how to better reach their target markets or implement more effective advertising campaigns.

FIGS. 5A, 5B, 6-9, 10A, 10B, 11A, 11B, and 12-16 are flow diagrams representative of example processes that may be executed to implement the example methods, apparatus, and systems described herein. In some example implementations, the example methods of FIGS. 5A, 5B, 6-9, 10A, 10B, 11A, 11B, and 12-16 may be wholly or partially implemented using machine readable instructions comprising a program for execution by a processor (e.g., the processor 100 of FIG. 2 and/or the processor 1712 of FIG. 17). The programs may be embodied in software stored on a tangible medium such as a CD-ROM, a floppy disk, a hard drive, a digital versatile disk (DVD), or a memory associated with the processor 100 and/or the processor 1712 and/or embodied in firmware and/or dedicated hardware in a well-known manner. Further, although the example programs are described with reference to the flow diagrams illustrated in FIGS. 5A, 5B, 6-9, 10A, 10B, 11A, 11B, and 12-16, persons of ordinary skill in the art will readily appreciate that many other methods of implementing the example methods, apparatus, and systems described herein may alternatively be used. For example, the order of execution of the blocks may be changed, and/or some of the blocks described may be changed, eliminated, or combined.

Figure 5A:
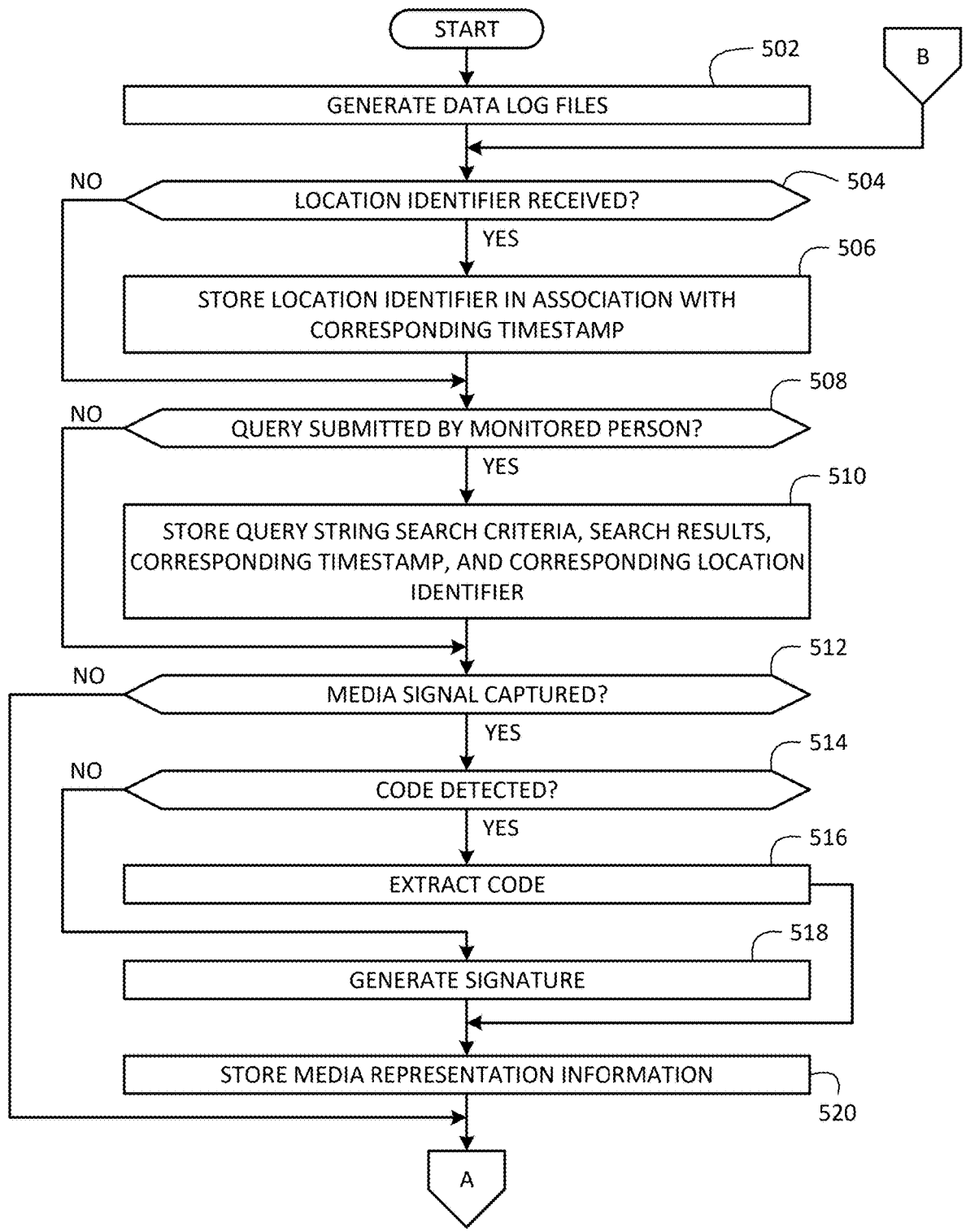
FIGS. 5A and 5B depict a flow diagram representative of example machine readable instructions that may be executed to collect data using the example PPM of FIGS. 1-3.
Figure 5B:
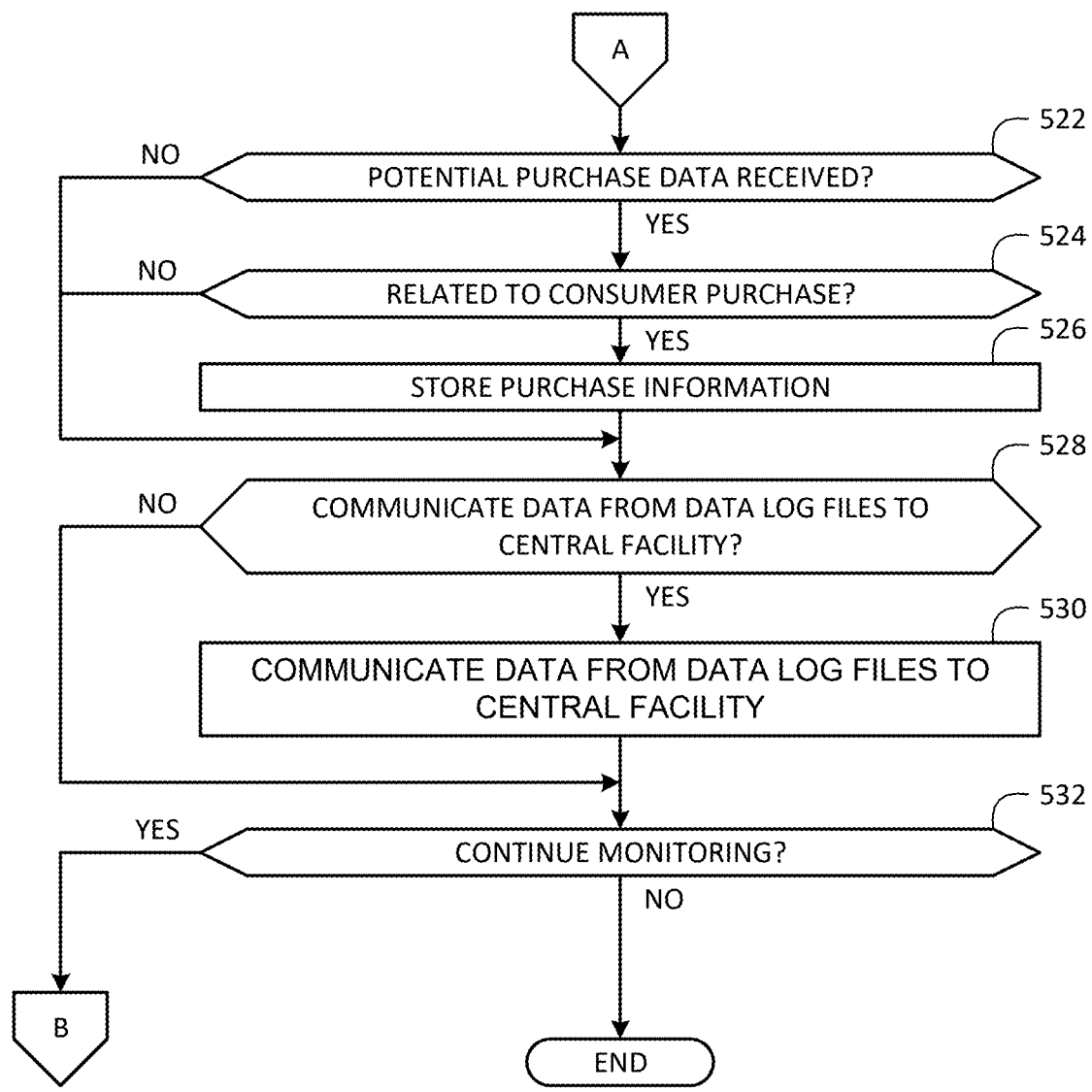

FIGS. 5A and 5B depict a flow diagram of an example process that may be performed by the PPM 30 of FIGS. 1-3 to collect data using the example apparatus 160 of FIG. 3. Initially, the example apparatus 160 generates and stores the data log files 180, 182, 184, and 186 of FIG. 3 (block 502) in the memory 104. The location data collector 164 (FIG. 3) then determines whether a location identifier (e.g., location coordinates or other location information indicative of a location) has been received (block 504) from, for example, the location and motion sensors 110. If a location identifier has been received (block 504), the location data collector 164 stores the location identifier in association with a corresponding timestamp in a log entry or record in the location data log file 180 of FIG. 3 (block 506). In the illustrated example, the location data collector 164 may create a timestamp using a time value read from the timer/counter 118 of FIG. 2.

After the location data collector 164 stores the location identifier (block 506) or if the location data collector 164 has not received a location identifier (block 504), the web event data collector 166 (FIG. 3) determines whether any queries or search requests have been submitted by the monitored person 32 via the location-based web services application (block 508). If a query has been submitted (block 508), the web event data collector 166 stores the query string search criteria (e.g., the user-provided search terms) in association with the search results of the query (received from the web server 50 and the web information application controller 162), a corresponding timestamp, and a corresponding location identifier (block 510).

After the web event data collector 166 stores the query string search criteria and associated information (block 510) or if the web event data collector 166 determines that a query has not been submitted (block 508), the media capture data collector 168 (FIG. 3) determines whether a media signal (e.g., an audio signal, a video signal, an RF signal, etc.) has been captured (block 512). For example, the media signal may be an audio signal associated with an advertisement presented by the audio device 16 or the video device 18 (FIG. 1), a video signal presented by the video device 18 (FIG. 1), or an RF signal emitted by the RF transceiver 22 of the billboard 20 (FIG. 1).

The media capture data collector 168 then determines whether the captured media signal includes a code (block 514). If the captured media signal includes a code, the media capture data collector 168 extracts (or creates a copy of) the code (block 516). If the captured media signal does not include a code (block 514), the media capture data collector 168 generates a signature of the captured media signal (block 518). Alternatively, a signature can always be collected regardless of whether a code was collected. After the media capture data collector 168 extracts a code (block 516) and/or generates a signature (block 518), the media capture data collector 168 stores the media representation information (e.g., the code and/or the signature) (block 520) in the media data log file 184 (FIG. 3).

After the media capture data collector 168 stores the media representation information (block 520) or if the media capture data collector 168 determines that a media signal has not been captured (block 512), the consumer purchase data collector 170 determines whether any input data relating to potential purchases have been received (block 522) (FIG. 5B). In the illustrated example, the potential purchase data is data indicative of a product or a service such as, for example, bar code information read using the bar code reader 136 (FIG. 2) or RFID information received via the RF transceiver 134 (FIG. 2) in response to the monitored person 32 scanning a product or a service document. If the consumer purchase data collector 170 determines that potential purchase data has been received (block 522), the consumer purchase data collector 170 determines whether the monitored person 32 purchased the product or service corresponding to the received potential purchase data (block 524). For example, the consumer purchase data collector 170 may receive subsequent information or the potential purchase information received at block 522 may have a corresponding purchase confirmation flag indicating that the monitored person 32 purchased the related product or service. If the consumer purchase data collector 170 determines that the monitored person 32 made the purchase (block 524), the consumer purchase data collector 170 stores the purchase information (block 526) in association with a corresponding timestamp and location identifier in the purchase data log file 186 (FIG. 3).

The example apparatus 160 then determines whether it should communicate the data from the data log files 180, 182, 184 and/or 186 to the central facility 60 of FIG. 1 (block 528). If the example apparatus 160 determines that it should communicate the data to the central facility 60, the location data collector 164, the web event data collector 166, the media capture data collector 168, and/or the purchase data collector 170 transmit the data from their respective log files 180, 182, 184, and/or 186 to the central facility 60 (block 530). After the example apparatus 160 communicates the data to the central facility 60 (block 530) or if the example apparatus 160 determines that it should not communicate the data to the central facility 60 (block 528), the example apparatus 160 determines whether it should continue to the monitor (block 532) for additional received information. If the example apparatus 160 determines that it should continue to monitor (block 532), control returns to block 502 (FIG. 5A). Otherwise, the process of FIGS. 5A and 5B ends.

In some example implementation, the PPM 30 is configured (e.g., provided with diagnostic software routines or diagnostic hardware) to periodically and/or aperiodically perform hardware and/or software diagnostic routines to ensure that the hardware (e.g., the media monitoring sensors 108, the location and motion sensors 110, the timer/counter 118, the voice codec 102, the memory 104, etc. of FIG. 2) and/or software of the PPM 30 are operating properly and/or within acceptable tolerances. If resulting diagnostic information indicates that the PPM 30 is not working properly or within acceptable tolerances, the PPM 30 may communicate the results to the central office 60 (FIG. 1), and/or the PPM 30 and/or the central office 60 may inform the monitored person 32 to return the PPM 30 for repair or exchange.

The PPM 30 may also be configured to calibrate itself. For example, the PPM 30 may be configured to calibrate individual and/or all components of the PPM 30 (e.g., perform sensor calibrations on some or all of the media monitoring sensors 108 and/or the location and motion sensors 110 of FIG. 2). In this manner, the PPM 30 may perform a calibration routine prior to being given to a monitored person (e.g., the monitored person 32 of FIG. 1). Additionally or alternatively, the PPM 30 may perform the calibration routine in response to any suspect diagnostic information resulting from the periodic diagnostic routines. If calibration routines fail to make the PPM 30 operate properly or within acceptable tolerances, the PPM 30 may communicate a message to the central facility 60 indicating the failure, and/or the PPM 30 and/or the central office 60 may inform the monitored person 32 to return the PPM 30 for repair or exchange.

Figure 6:
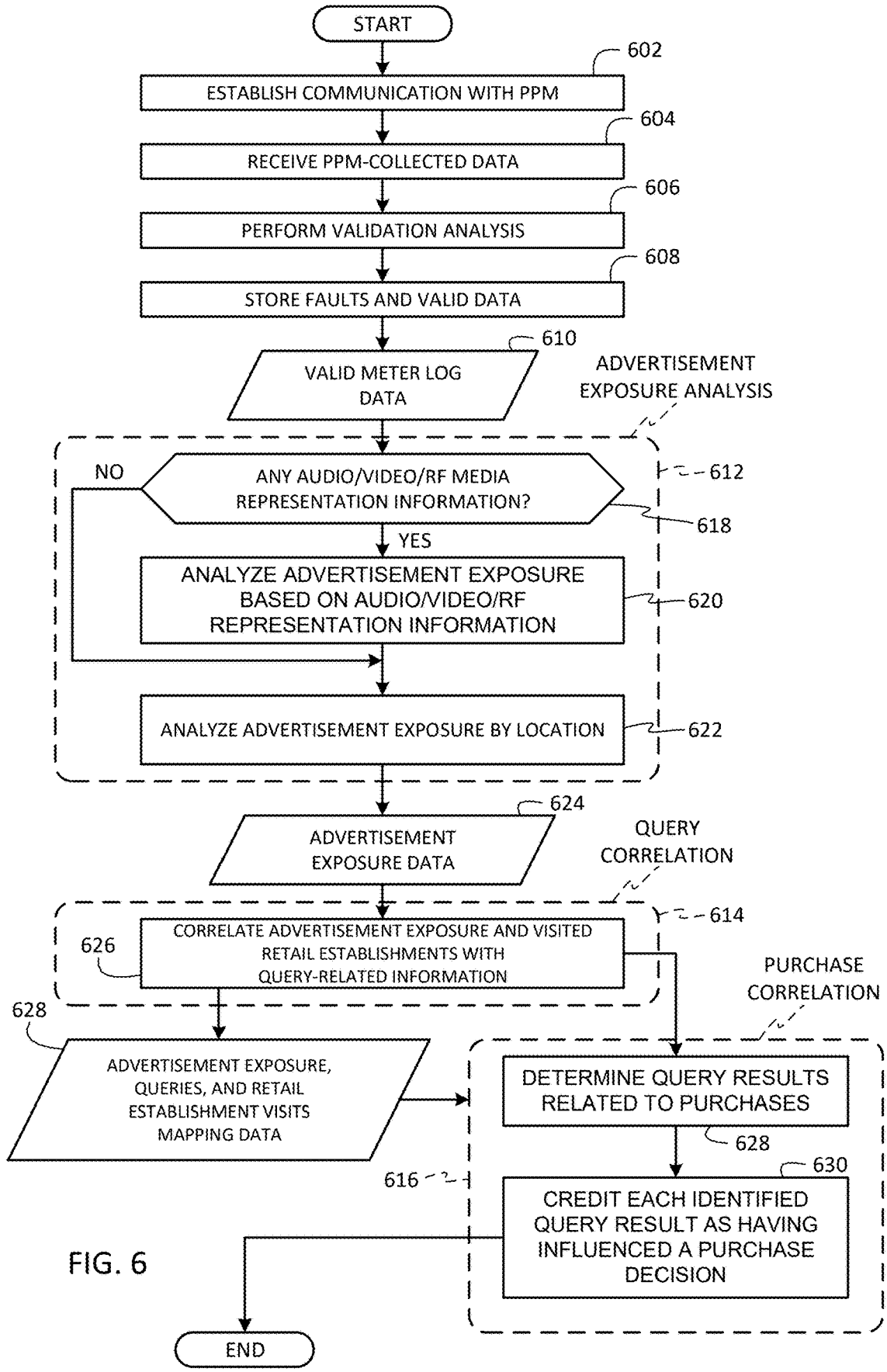
FIG. 6 is a flow diagram representative of example machine readable instructions that may be executed to analyze data collected by the example PPM of FIGS. 1-3.

FIG. 6 is a flow diagram of an example analysis process that may be performed by the servers 70 and 74 (FIGS. 1 and 4) and/or the example apparatus 200 (FIG. 4) to analyze data collected by the example PPM 30 of FIGS. 1-3. Initially, the server 70 establishes communications with the PPM 30 (block 602), which may be initiated by the PPM 30 via, for example, an alert message that the server 70 can use to obtain and store the identification of the PPM 30. For example, the alert message may be sent by the PPM 30 at block 530 of FIG. 5B. The receiver 202 (FIG. 4) then receives the PPM-collected data from the PPM 30 (block 604). In the illustrated example, the PPM-collected data includes data from the location data log file 180, the web event data log file 182, the media data log file 184, and/or the consumer purchase data log file 186. The data fault detector 204 (FIG. 4) then performs a validation analysis of the received data (block 606) to determine whether any of the received data is invalid or whether any data is missing. Example validation processes that may be used to implement the validation analysis of block 606 are described below in connection with FIGS. 9, 10B, 11B, 12, 13, and 14. The data file interface 206 (FIG. 4) then stores indicators or tags or other information in association with the received data to indicate valid data and any faults in the data (block 608). In the illustrated example, the data file interface 206 stores the valid data in a valid meter log data structure 610 (e.g., a file, a database, a table, etc.) that is used to subsequently perform an advertisement exposure analysis 612, a query correlation analysis 614, and a purchase correlation analysis 616. The valid meter log data structure 610 may be stored in the database 72 of FIGS. 1 and 4.

During the advertisement exposure analysis 612, the data analyzer 208 (FIG. 4) determines whether the valid meter log data structure 610 includes any audio/video/RF media representation information (block 618) such as, for example, audio/video/RF codes or signatures collected in connection with blocks 512, 514, 516, 518, and 520 of FIG. 5A. If the data analyzer 208 determines that the valid log data structure 610 includes one or more audio/video/RF media representation information (block 618), the data analyzer 208 analyzes the advertisement exposure based on the audio/video/RF representation information (block 620). An example implementation of the advertisement exposure analysis of the audio/video/RF media representation information is described below in connection with the example process of FIG. 7.

After the data analyzer 208 analyzes the advertisement exposure based on audio/video/RF representation information (block 620) or if the data analyzer 208 determined that the valid meter log data structure 610 does not include any audio/video/RF media representation information (block 618), the data analyzer 208 analyzes advertisement exposure based on location information (block 622) in the valid meter log data structure 610 indicative of the locations at which the PPM 30, and thus, the monitored person 32, were located. For example, for each valid location identifier, the data analyzer 208 can determine if that location is sufficiently proximate to an advertisement at a fixed or stationary location such that the monitored person 32 would have been exposed to the advertisement so that the monitored person 32 could be influenced by the advertisement to perform some action (e.g., request information, purchase a product/service, visit an advertised retail establishment, etc.) related to the advertisement. An example implementation of the advertisement exposure analysis based on location information is described below in connection with the example process of FIG. 7. In the illustrated example, the data file interface 206 stores information indicative of advertisements to which the monitored person 32 was exposed in an advertisement exposure data structure 624 (e.g., a file, a database, a table, etc.).

During the query correlation analysis 614, the data analyzer 208 correlates or associates instances of advertisement exposure indicated in the advertisement exposure data structure 624 and/or visits to retail establishments with query-related information (e.g., user-submitted queries and/or query results) (block 626). In the illustrated example, the query-related information includes the user-submitted query information (e.g., query search strings, search terms, search criteria, etc.) and the query results stored by the web event data collector 166 (FIG. 3) at block 510 of FIG. 5A. The data analyzer 208 may retrieve the query-related information from the valid meter log data structure 610. At block 626, the data analyzer 208 may associate an instance of an advertisement exposure and/or a user's visit to a retail establishment with one or more user-submitted queries and the query search results when the queries and the query results are related to or associated with the product or service advertised in the advertisement. In the illustrated example, the data file interface 206 stores flags, indicators, or other information indicating the association between instances of advertisement exposures, queries/query results, and retail establishment visits in an advertisement exposure, queries, and store visits mapping data structure 628. An example process that may be used to implement the query correlation analysis 614 is described below in connection with FIG. 8.

During the purchase correlation analysis 616, the data analyzer 208 determines which of the query results are related to purchases (block 628) made by, for example, the monitored person 32 (FIG. 1). For example, the data analyzer 208 may determine that one or more query results are related to one or more purchases if the query results contain information related to or associated with one or more product or service purchases. The data analyzer 208 can then credit each query result identified in block 628 as having influenced one or more purchase decisions (block 630) made by, for example, the monitored person 32. In the illustrated example, the data analyzer 208 can store the information generated at block 630 in the consumer behavior knowledgebase 214 (FIG. 4) to create behavior information indicative of how consumers react to particular information (e.g., query search results) and/or advertisements. The example process of FIG. 6 then ends.

Figure 7:
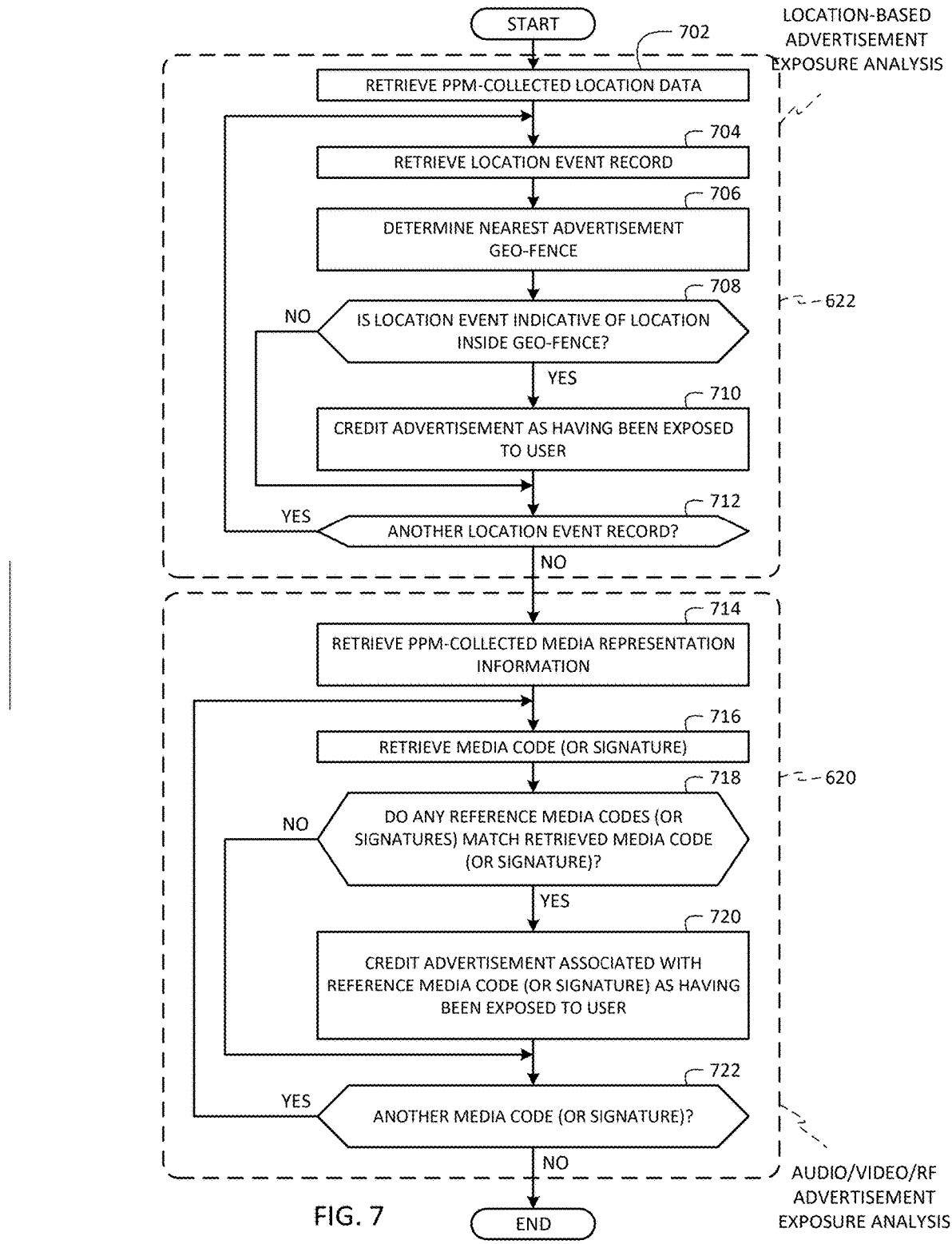
FIG. 7 is a flow diagram representative of example machine readable instructions that may be executed to determine advertisements to which monitored persons were exposed based on data collected by the PPM of FIGS. 1-3.

FIG. 7 depicts a flow diagram of an example process that may be used to implement the advertisement exposure analyses of blocks 620 and 622 of FIG. 6. In the below-description, the location-based advertisement exposure analysis 622 is described first followed by a description of the audio/video/RF-based advertisement exposure analysis 620. Initially, the receiver 202 (FIG. 4) retrieves the PPM-collected location data (block 702) from, for example, the valid log meter data structure 610 (FIG. 6). The data analyzer 208 then retrieves a location event record (block 704) and determines a nearest advertisement geo-fence (block 706) based on advertisement location identifiers stored in geo-coded advertisement database 210 (FIG. 4). In the illustrated example, a geo-fence (i.e., a geographical boundary) is defined by a maximum distance partially or wholly surrounding an advertisement at which a person (e.g., the monitored person 32) is deemed to be able to perceive or be exposed to an advertisement such that the advertisement can have some influence on the person to perform some action (e.g., request information, purchase a product/service, visit an advertised retail establishment, etc.) related to the advertisement. To determine a geo-fence for an advertisement, the data analyzer 208 may determine an area (e.g., a radial area, a pie shaped area fanning out from the advertisement location, or any other shaped area) surrounding, partially surrounding, and/or adjacent to the location of each advertisement. In some example implementations, the data analyzer 208 may determine that a person was exposed to an advertisement if the person was within a particular distance from the advertisement and facing a particular direction or within a range of directions (e.g., the data analyzer 208 may use direction information generated by the PPM 30 using the compass 150 of FIG. 2).

The data analyzer 208 then determines whether the location event information retrieved at block 704 is indicative of a location inside the geo-fence (block 708). If the location is inside the geo-fence (block 708), the data analyzer 208 credits the advertisement corresponding to the geo-fence as having been exposed to the monitored person 32 (block 710). In the illustrated example, the data analyzer 208 credits the advertisement by storing a flag, an indicator, or some other information indicative of exposure credit in the advertisement exposure data structure 624 (FIG. 6) in association with the advertisement identifier. After the data analyzer 208 credits the advertisement (block 710) or if the data analyzer 208 determines that the location event information is not indicative of a location within the geo-fence (block 708), the data analyzer 208 determines whether another location event record remains to be analyzed (block 712). If at least another location event record remains to be analyzed (block 712), control returns to block 704.

If no other location event records remain to be analyzed (block 712), the receiver 202 retrieves PPM-collected media representation information (e.g., audio/video/RF codes or signatures) (block 714) from, for example, the valid meter log data structure 610 (FIG. 6). The data analyzer 208 then retrieves a media code or signature (block 716) from the retrieved PPM-collected media representation information to perform the audio/video/RF-based advertisement exposure analysis 620. The data analyzer 208 then determines whether any reference media codes or signatures match the retrieved media code or signature (block 718). For example, the data analyzer 208 may compare the retrieved media code or signature with reference media codes or signatures stored in the reference media codes/signatures database 211 of FIG. 4.

If the data analyzer 208 determines that a reference media code or signature matches the retrieved media code or signature (block 718), the data analyzer credits the advertisement associated with the reference media code or signature as having been exposed to the monitored person 32 (block 720). In the illustrated example, the data analyzer 208 credits the advertisement by storing a flag, an indicator, or some other information indicative of exposure credit in the advertisement exposure data structure 624 (FIG. 6) in association with the advertisement identifier. After the data analyzer 208 credits the advertisement (block 720) or if the data analyzer 208 determines that no reference media codes or signatures match the retrieved media code or signature (block 718), the data analyzer 208 determines whether another media code or signature remains to be analyzed (block 722). If at least another media code or signature remains to be analyzed (block 722), control returns to block 716. Otherwise, the example process of FIG. 7 ends.

Figure 8:
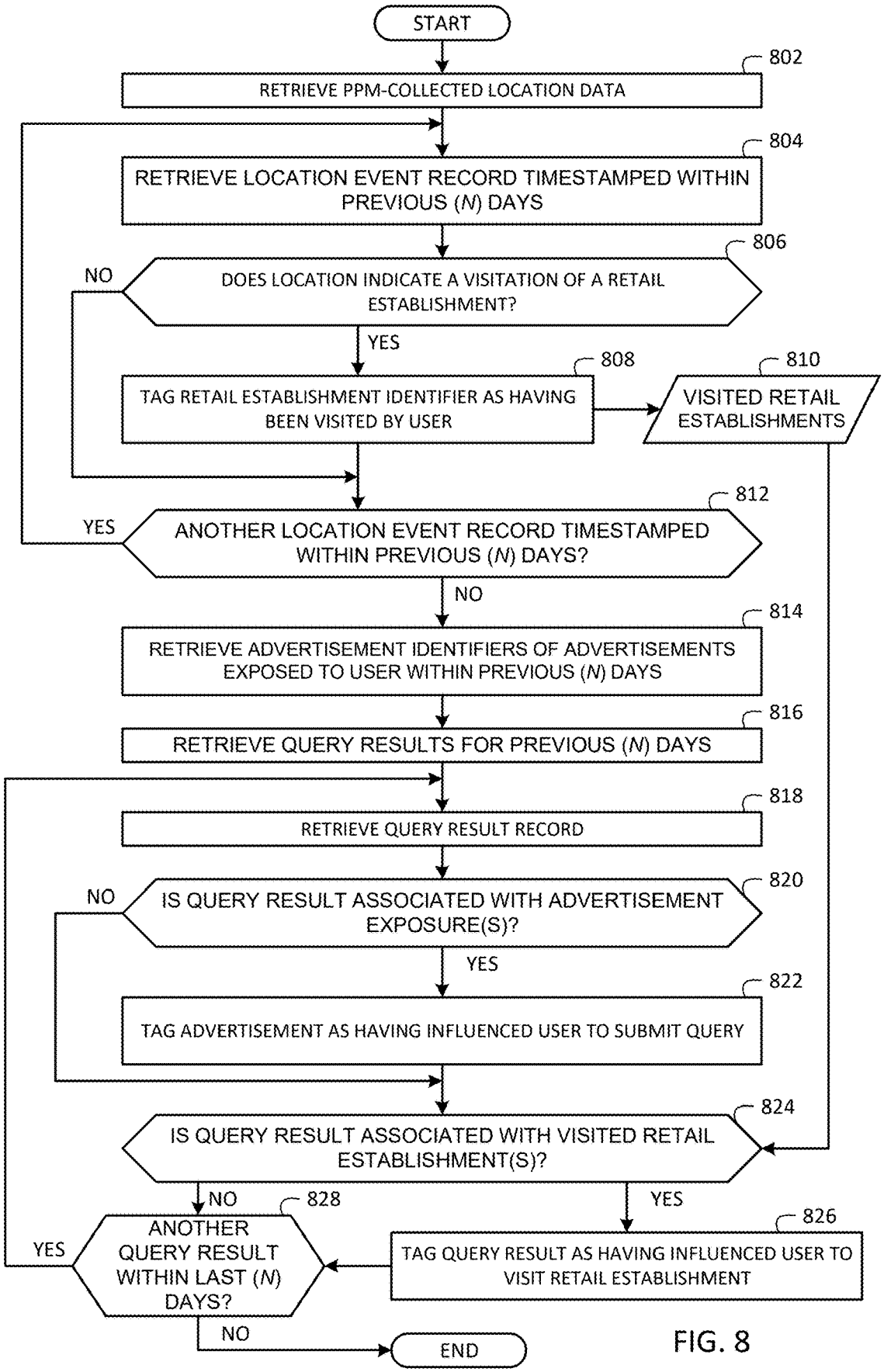
FIG. 8 is a flow diagram representative of example machine readable instructions that may be executed to correlate advertisement exposure and/or visitations to retail establishments with events related to queries submitted by a monitored person via the PPM of FIGS. 1-3.

FIG. 8 depicts a flow diagram of an example process that may be used to implement the query correlation analysis 612 of FIG. 6. Initially, the receiver 202 (FIG. 4) retrieves the PPM-collected location data (block 802) from, for example, the valid log meter data structure 610 (FIG. 6). The data analyzer 208 then retrieves a location event record timestamped within the previous (N) days (block 804). In the illustrated example, the previous (N) days specifies a recent history within which exposure to web event data (e.g., query search results) and/or advertisements could have some causal effect on a person's actions such as, for example, purchasing a product, purchasing a service, visiting a retail establishment, etc. For example, the previous (N) days can specify the maximum time that can lapse between a monitored person submitting a query or being exposed to an advertisement and the person performing some action (e.g., visit a retail establishment, purchase a product/service, etc.) related to the query search results or that advertisement so that the query search results or advertisement can be credited as having influenced the monitored person to perform the action. The number of days (N) can be determined by a metering entity implementing the example methods and apparatus described herein. For example, the number of days (N) can be determined based on a person's typical memory retention time of previously observed objects. In some example implementations, the amount of lapsed time may be a number of hours instead of a number of days.

The data analyzer 208 then determines whether the retrieved location event information specifies a location indicative of the monitored person 32 having visited a retail establishment (block 806). In the illustrated example, the data analyzer 208 can compare the retrieved location event information to location information stored in the storefront and product geo-coded knowledgebase 212 of FIG. 4 to determine whether the retrieved location event information corresponds to a location of a retail establishment. If the retrieved location event information is indicative of a visitation to a retail establishment, the data analyzer 208 stores a tag, a flag, or some other information in connection with the retail establishment identifier to indicate that the retail establishment was visited by the monitored person 32 (block 808). In the illustrated example, the data analyzer 208 stores the tagged or flagged retail establishment identifier in a visited retail establishment data structure 810 and/or the advertisement exposure, queries, and retail establishment visits mapping data structure 628 of FIG. 6. After tagging or flagging the retail establishment identifier (block 808) or if the data analyzer 208 determines that the retrieved location identifier is not indicative of a retail establishment visitation (block 806), the data analyzer 208 determines whether another location event record timestamped within the previous (N) days remains to be analyzed (block 812). If another location event record remains (block 812), control is passed back to block 804.

If the data analyzer 208 determines that no other location event record remains to be analyzed (block 812), the data analyzer 208 retrieves advertisement identifiers of advertisements to which the monitored person 32 was exposed within the previous (N) days (block 814) and query results received by the PPM 30 within the previous (N) days (block 816). In the illustrated example, the data analyzer 208 retrieves the exposed to advertisement identifiers and the query results from the valid meter log data structure 610 (FIG. 6). The data analyzer 208 then retrieves a query result record (block 818) from the query results retrieved at block 816 and determines whether the query result is associated with one or more advertisement exposures (block 820). For example, the data analyzer 208 may compare the query result information with advertisements indicated in the advertisement exposure data 624 of FIG. 6 to determine whether the query result information is related to or associated with (e.g., the query result includes information about a product, service, or retail establishment advertised by the advertisement) any of the advertisements to which the monitored person was exposed. If the data analyzer 208 determines that the retrieved query result is associated with one or more advertisement exposures, the data analyzer 208 stores a tag, a flag, or some other information in association with the advertisement exposure information to indicate that the identified advertisements influenced the monitored person 32 to submit the query associated with the query results (block 822). In some example, implementations, the data analyzer 208 may alternatively or additionally compare query search terms or search criteria submitted by the monitored person 32 to the advertisements indicated in the advertisement exposure data 624 to determine whether any of the advertisements influenced the monitored person 32 to submit the query.

After the data analyzer 208 stores a tag, a flag, or some other information in association with the advertisement exposure information (block 822) or if the data analyzer 208 determines that the retrieved query result is not related to or associated with any advertisement exposures (block 820), the data analyzer 208 determines whether the query result information is associated with or related to one or more retail establishments visited by the monitored person 32 (block 824). For example, the data analyzer 208 can compare the query result information with visited retail establishment information stored in the visited retail establishment data structure 810 to determine whether any information associated with the retail establishments (e.g., name, street address, products offered, services offered, etc.) match or substantially match the query result information. If the data analyzer 208 determines that the query result information is associated with or related to one or more visited retail establishments (block 824), the data analyzer 208 stores a tag, a flag, or some other information in association with the query result to indicate that the query result influenced the monitored person 32 to visit a retail establishment (block 826). In the illustrated example, the data analyzer 208 can store the tag, flag, or other information in association with the query result in the advertisement exposure, queries, and retail establishment visits mapping data structure 628 of FIG. 6.

After the data analyzer 208 stores a tag, a flag, or some other information in association with the query result (block 826) or if the data analyzer 208 determines that the retrieved query result is not related to or associated with any visited retail establishments (block 824), the data analyzer 208 determines whether another query result received by the user within the previous (N) days remains to be analyzed (block 828). If the data analyzer 208 determines that at least another query result remains to be analyzed (block 828), control is passed back to block 818. Otherwise, the example process of FIG. 8 is ended.

Figure 9:
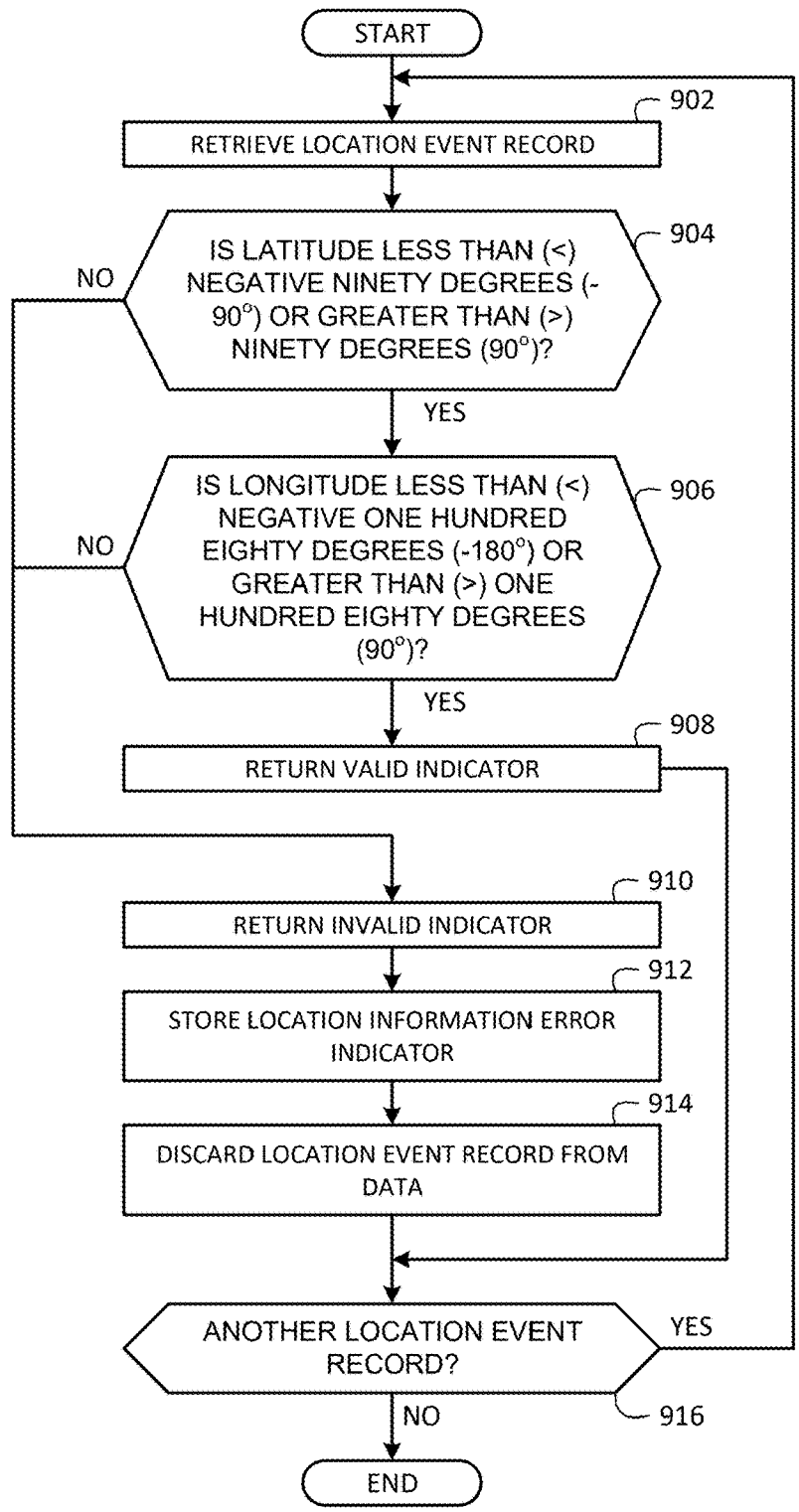
FIG. 9 is a flow diagram representative of example machine readable instructions that may be executed to implement a location data validation process to determine the validity of location data collected by the PPM of FIGS. 1-3.

FIG. 9 is a flow diagram of an example location information validation process that may be performed by the example apparatus 200 (FIG. 4). The example process of FIG. 9 may be used to implement the example validation analysis of block 606 of FIG. 6. Initially, the data receiver 202 (FIG. 4) retrieves a location event record from the data received from the location data log file 180 of the PPM 30 (block 902), and the fault detector 204 (FIG. 4) determines whether the latitude coordinate is valid by determining whether the latitude coordinate is within a range between −90 degrees and 90 degrees (block 904). If the fault detector 204 determines that the latitude coordinate is valid (block 904), the fault detector 204 determines whether the longitude coordinate is valid by determining whether the longitude coordinate is within −180 degrees and 180 degrees (block 906). In other example implementations, other geographical coordinate systems having different ranges and/or units may be used. If the fault detector 204 determines that the longitude coordinate is valid (block 906), the data fault detector 204 returns a valid indicator to indicate that the retrieved location event record is valid (block 908).

If the fault detector 204 determines that the longitude coordinate is valid (block 906) or that the latitude coordinate is not valid (block 904), the fault detector 204 returns an invalid indicator to indicate that the retrieved location event record is not valid (block 910). The data file interface 206 then stores a location information error indicator (block 912) in, for example, the valid meter log data structure 610 of FIG. 6 to indicate that the location coordinates were not valid. The fault detector 204 or the data file interface 206 then discards the invalid location event record from the location data (block 914).

After discarding the invalid location event record from the location data (block 914) or after returning a valid indicator (block 908), the fault detector 204 determines whether another location event record remains to be analyzed (block 916). If at least another location event record remains to be analyzed (block 916), control is passed back to block 902. Otherwise, the example process of FIG. 9 is ended.

Figure 10A:
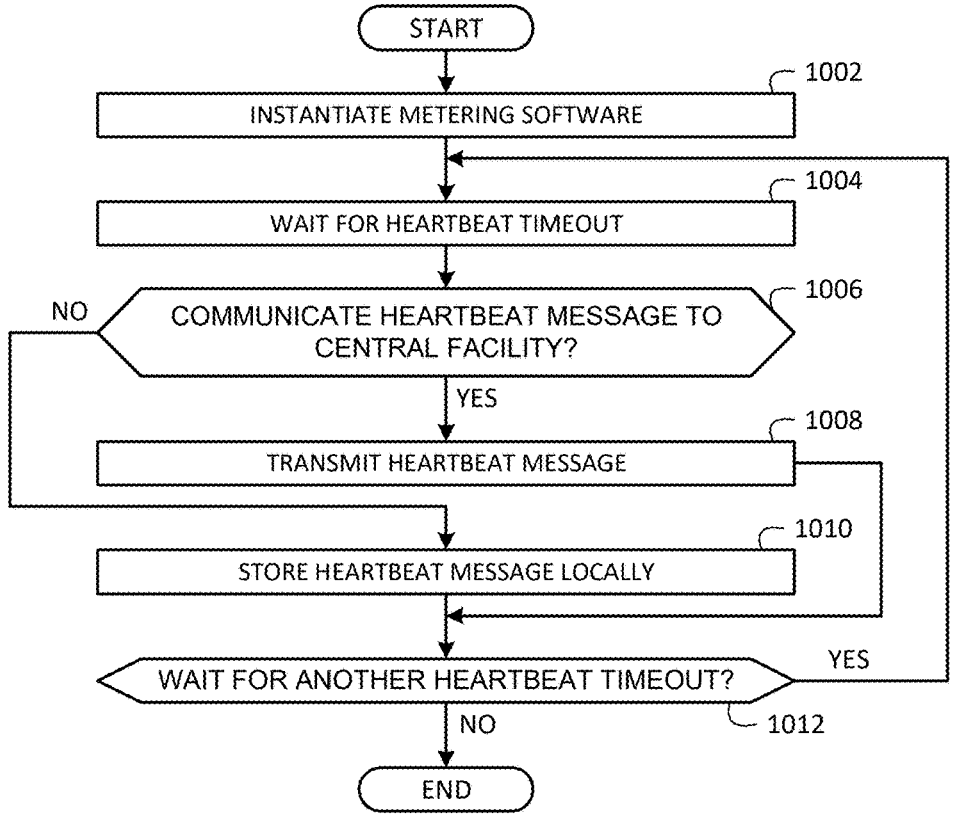
FIG. 10A is a flow diagram representative of example machine readable instructions that may be executed to generate and store heartbeat information that may subsequently be used to determine the validity of data collected by the PPM of FIGS. 1-3.

FIG. 10A is a flow diagram for an example heartbeat process that may be performed by the processor 100 of the PPM 30 to generate heartbeat information that may subsequently be used to determine the validity of metering data collected by the PPM 30. Initially, the processor 100 (FIG. 2) of the PPM 30 instantiates metering software (block 1002) used to collect the web event (e.g., query event), location event, media signal capture event, and/or purchase event information. The processor 100 then waits for a heartbeat timeout (block 1004). The heartbeat timeout is determined by the periodic time at which the PPM 30 generates a heartbeat message to confirm the presence or operation of the PPM 30 in the geographic area 10. In an example implementation, the PPM 30 may transmit heartbeat messages indicative of the heartbeat timeouts to the central facility 60 (FIG. 1) substantially in real time, and the central facility 60 may analyze the heartbeat messages substantially in real time or during a post process to confirm that the PPM 30 is operational and/or within the geographic area 10. Alternatively or additionally, the PPM 30 may store the heartbeat messages in the memory 104 (FIG. 2) of the PPM 30. For example, the PPM 30 may store the heartbeat messages in the location data log file 180 (FIG. 3) (or in any of the other data log files 182, 184, and 186), and the central facility 60 may analyze the heartbeat messages in connection with the location data log file 180 during a post process.

When the timeout is reached (block 1004), the processor 100 determines whether it should communicate a heartbeat message indicative of the heartbeat timeout to the central facility 60 (block 1006). For example, the processor 100 may check a configuration setting (e.g., a transmit heartbeat message configuration bit) in the memory 104 to determine whether it should transmit the heartbeat message. If the processor 100 determines that it should communicate the heartbeat message to the central facility 60 (block 1006), the processor 100 transmits the heartbeat message to the central facility 60 via the communications interface 106 (block 1008). Otherwise, the processor 100 stores the heartbeat message locally (block 1010) in, for example, the location data log file 180 (FIG. 3) in the memory 104. After transmitting the heartbeat message to the central facility 60 (block 1008) or after storing the heartbeat message locally (block 1010), the processor 100 determines whether it should wait for another heartbeat timeout (block 1012). For example, if the metering software is still instantiated, the processor 100 may determine that it should wait for another heartbeat timeout (block 1012) and control is passed back to block 1004. Otherwise, the example process of FIG. 10A is ended.

Figure 10B:
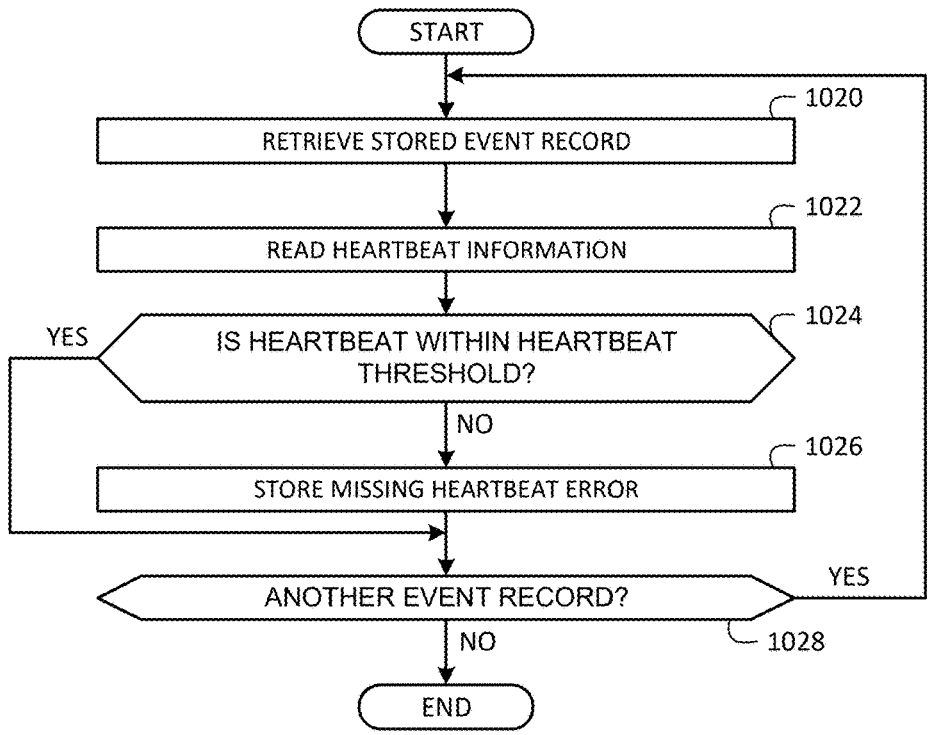
FIG. 10B is a flow diagram representative of example machine readable instructions that may be executed to determine the validity of data collected by the PPM based on the heartbeat information generated using the example process of FIG. 10A.

FIG. 10B is a flow diagram of an example heartbeat analysis process that may be performed by the example apparatus 200 (FIG. 4) to examine data log files received from a PPM (e.g., the PPM 30) to determine whether data collected by the PPM is valid. The example process of FIG. 10B may be used to implement the example validation analysis of block 606 of FIG. 6. Initially, the data receiver 202 reads a stored event record in the data received from PPM 30 (block 1020). For example, the data receiver 202 can read the event record from data received from the location data log file 180 of FIG. 3. The data fault detector 204 then reads heartbeat information (e.g., a heartbeat message) stored in the retrieved event record (block 1022) and determines whether the corresponding heartbeat occurred within a threshold period of a previous heartbeat (block 1024). The threshold period specifies an allowable time within which a heartbeat must occur to indicate that the PPM 30 is functioning properly. If the heartbeat did not occur within the threshold period (block 1024), the data fault detector 204 stores a missing heartbeat error event (block 1026) in an error file created by the data file interface 206 (FIG. 4). Otherwise, if the heartbeat occurred within the threshold period (block 1024), the data fault detector 204 determines whether another event record remains to be analyzed (block 1028) and, if so, control is passed back to block 1020. Otherwise, the example process of FIG. 10B is ended.

Figure 11A:
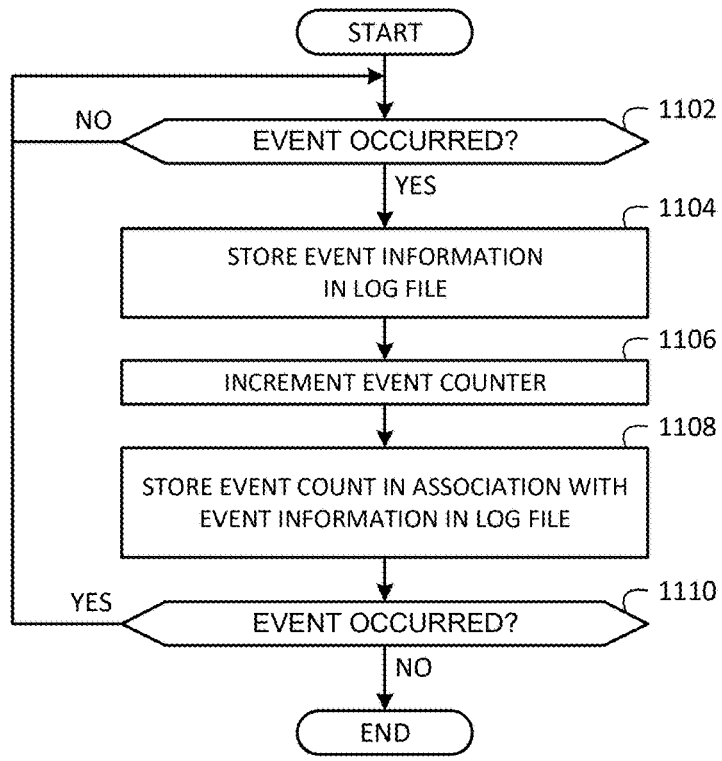
FIG. 11A is a flow diagram representative of example machine readable instructions that may be executed to generate and store sequential event counts in connection with respective data collected by the PPM of FIGS. 1-3 and that can subsequently be used to determine the validity of the collected data.

FIG. 11A is a flow diagram of an example event sequence generation process that may be performed by the data collectors 164, 166, 168, and 170 (FIG. 3) of the PPM 30 to store sequential event counts in connection with respective event information that can subsequently be used to determine the validity of data collected by the PPM 30. Initially, the data collector determines whether an event has occurred (block 1102). For example, in the case of the location data collector 164, an event is the periodic reading or reception of location data such as longitude and latitude coordinates from the location and motion sensors 110. In the case of the web data collector 166, the event is any action by the monitored person or results returned from the location-based web services application.

If an event has not occurred, the data collector continues to wait for an event (block 1102). Otherwise, if an event has occurred, the data collector stores the event information (block 1104) in, for example, a respective one of the log files 180, 182, 184, and 186. The data collector then increments an event count (block 1106) and stores the event count in association with the event information (block 1108). If the data collector is to wait for another event (block 1110), control is passed back to block 1102. Otherwise, the example process of FIG. 11A is ended.

Figure 11B:
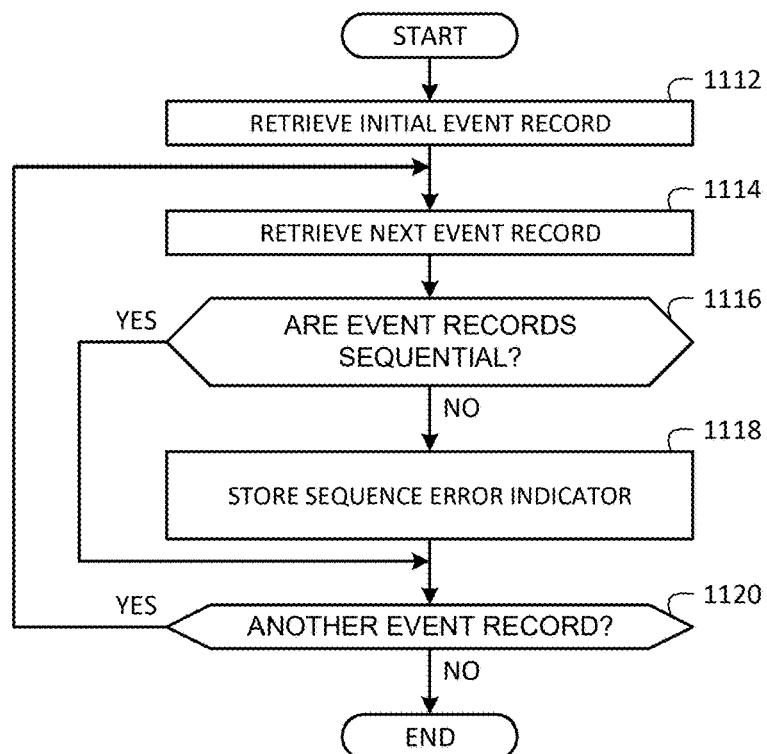
FIG. 11B is a flow diagram representative of example machine readable instructions that may be executed to determine the validity of the data collected by the PPM of FIGS. 1-3 based on the event counts generated using the example process of FIG. 11A.

FIG. 11B is a flow diagram of an example sequential event count confirmation process that may be performed by the example apparatus 200 (FIG. 4) when a data is received from a PPM (e.g., the PPM 30). The example process of FIG. 11B may be used to implement the example validation analysis of block 606 of FIG. 6. In the illustrated example, the example sequence confirmation process of FIG. 11B is used to monitor data integrity of information stored in data log files (e.g., the data log files 180, 182, 184, and 186 of FIG. 3) and to identify any data integrity problems associated with the data log files. For example, the example sequence confirmation process of FIG. 11B may be used to detect missing data in a data log file (e.g., consecutively stored data records missing a data record therebetween), non-sequential data (e.g., consecutively stored data records that are out of sequence), storage medium errors (e.g., storage disk surface damages), write errors, file system errors, etc.

As shown in FIG. 11B, the data receiver 202 initially retrieves an initial event record (block 1112) and then reads a next event record (block 1114) from the data received from the PPM 30 corresponding to a data log file. The data fault detector 204 then determines whether the next event record retrieved at block 1114 is in proper sequence (block 1116) relative to the initial event record retrieved at block 1112 based on the event counts of the event records. For example, the data fault detector 204 can compare the event counts stored in connection with block 1108 of FIG. 11A in the event records to determine whether they are sequential. If the events are not in proper sequence (block 1116), the data fault detector 204 stores a sequence error indicator (block 1118) in an error log file via the data file interface 206. After storing the sequence error indicator (block 1118) or if the data fault detector 204 determines that the events are sequential (block 1116), the data fault detector 204 determines whether there is another event record to be analyzed (block 1120). If there is another event record to be analyzed, control is passed back to block 1114. Otherwise, the example process of FIG. 11B is ended.

Figure 12:
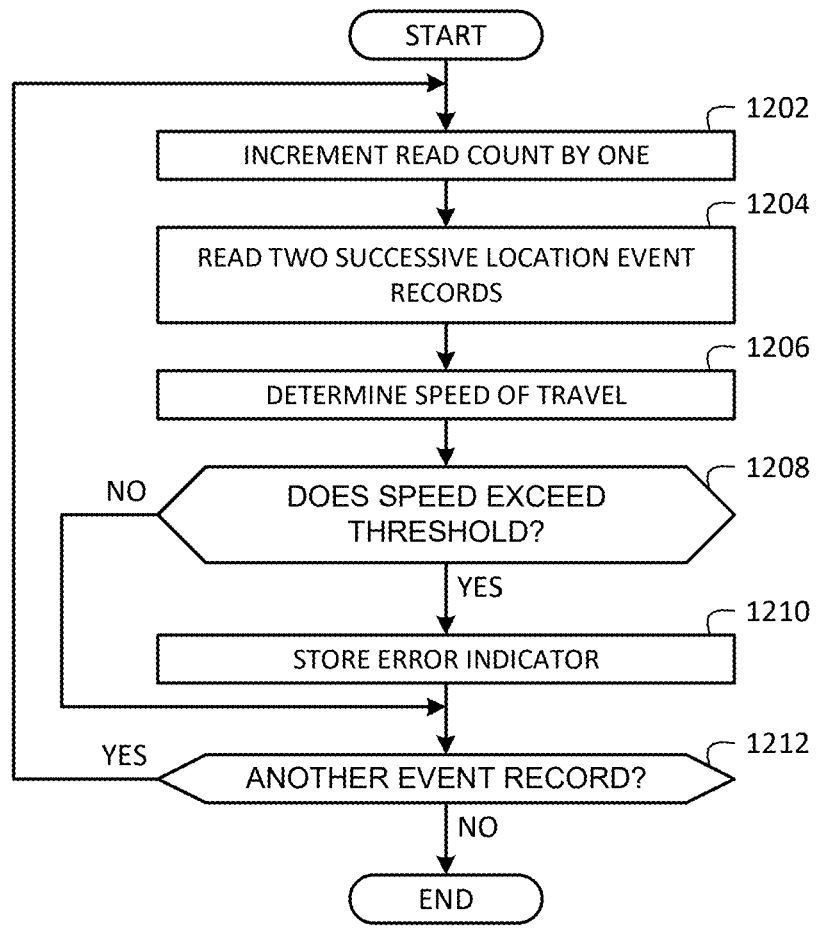
FIG. 12 is a flow diagram representative of example machine readable instructions that may be executed to determine the validity of location data collected by the PPM of FIGS. 1-3.

FIG. 12 is a flow diagram of an example speed detection and checking process which may be performed by the example apparatus 200 (FIG. 4) to determine the validity of location data collected by the PPM (e.g., the PPM 30). The example process of FIG. 12 may be used to implement the example validation analysis of block 606 of FIG. 6. Initially, the data receiver 202 increments a read counter by one (block 1202). The data receiver 202 then reads two successive location event records from data received from the PPM 30 (block 1204) corresponding to, for example, the location data log file 180 of FIG. 3. The data fault detector 204 then determines the speed of travel between the two location events (block 1206) by, for example, calculating the distance between the two locations and dividing by the time interval that elapsed between the collection of the two location events. The data fault detector 204 then determines whether the speed exceeds a threshold value (block 1208). If the speed exceeds the threshold value, an error is possible because the monitored person 32 is indicated as having traveled at an unexpected speed and the data fault detector 204 stores an error indicator (block 1210) in an error file via the data file interface 206. After storing the error indicator (block 1210) or if the speed does not exceed the threshold value (block 1208), the data fault detector 204 determines whether there is another event record remaining to be analyzed (block 1212) and, if so, control is passed back to block 1202. Otherwise, the example process of FIG. 12 is ended.

Figure 13:
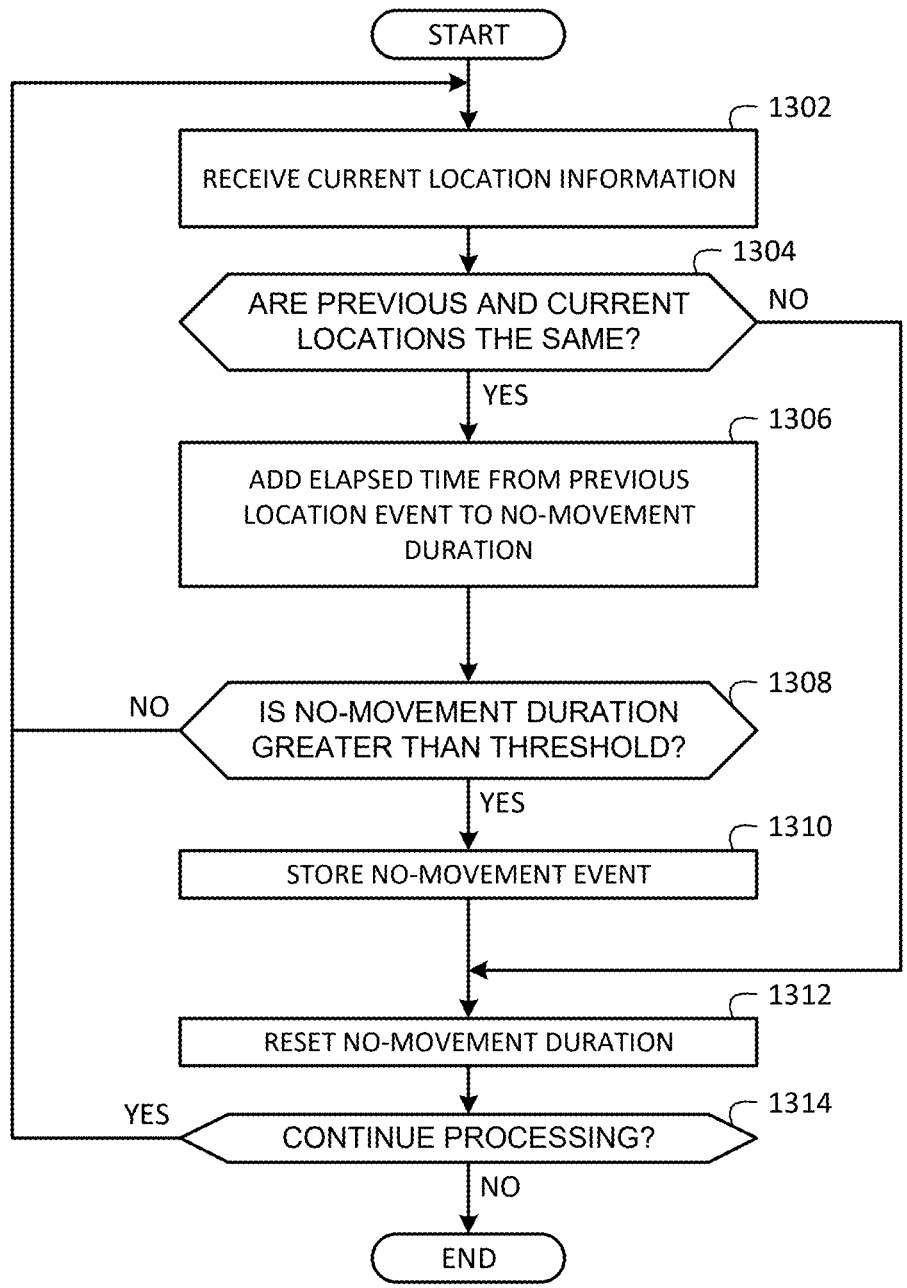
FIG. 13 is a flow diagram representative of example machine readable instructions that may be executed to determine whether there is sufficient movement to indicate that the PPM of FIGS. 1-3 was moved from one location to another.

FIG. 13 is a flow diagram of an example process that may be performed by the PPM 30 to determine whether there is sufficient movement to indicate that the PPM 30 was moved from one location to another. The example process of FIG. 13 may be implemented in real time by the PPM 30 or as a post process by the example apparatus 200 of FIG. 4. For purposes of discussion, the example process is described below as a post process performed by the example apparatus 200. Initially, the data receiver 202 reads current location information (block 1302) received from, for example, the location data log file 180 of FIG. 3. The data fault detector 204 then determines whether the current location is the same as a previous location read (block 1304). If the locations are the same (block 1304), which indicates no movement, the data fault detector 204 adds the elapsed duration between the entries to a no-movement duration value (block 1306). The data fault detector 204 then compares the no-movement duration value to a duration threshold to determine whether the no-movement duration is greater than the duration threshold (block 1308). If the no-movement duration is greater than the duration threshold, it is likely that the PPM 30 has not been moved for an excessive amount of time, which may indicate an error condition such as the monitored person 32 leaving the PPM 30 somewhere or the PPM is not functioning properly. If the no-movement duration value exceeds the time threshold (block 1308), the data fault detector 204 stores a no-movement event (block 1310) in an error file via the data file interface 206. After storing the no-movement event (block 1310) or if the data fault detector 204 determines that the previous and current locations are not the same (block 1304), the data fault detector 204 resets the no-movement duration value (block 1312) and determines whether it should continue processing the location information (block 1314). If the data fault detector 204 is to continue processing the location information (block 1314) or if the data fault detector 204 determines that the no-movement threshold is not greater than the time threshold (block 1308), control is passed back to block 1302. Otherwise, if the data fault detector 204 is not to continue processing, the example process of FIG. 13 is ended.

Figure 14:
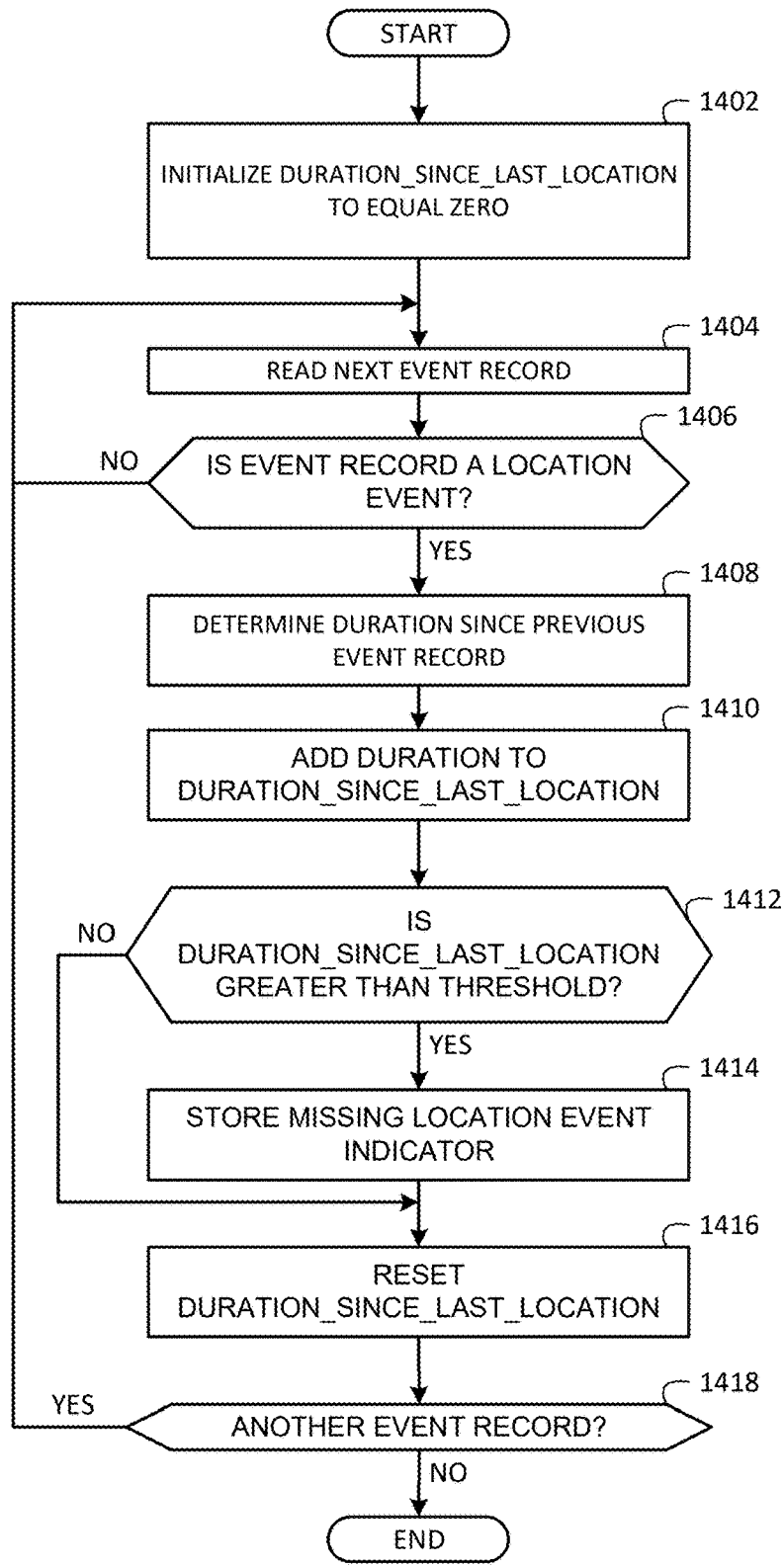
FIG. 14 is a flow diagram representative of example machine readable instructions that may be executed to detect missing location event entries in location data collected by the PPM of FIGS. 1-3.

FIG. 14 is a flow diagram of an example process that may be performed by the example apparatus 200 (FIG. 4) to detect missing location event entries in location data log files received by the central facility 60 from a PPM such as the location data log file 180 of the PPM 30. The example process of FIG. 12 may be used to implement the example validation analysis of block 606 of FIG. 6. Initially, the data fault detector 204 initializes a data variable relating to the duration since the last location event by setting the data variable to zero (block 1402). The data receiver 202 then reads a next event record (block 1404) from data received from the PPM 30. The fault detector 204 then determines whether the retrieved event record is a location event record (block 1406). If the retrieved event record is a location event record (block 1406), the fault detector 204 determines the duration between the previous event and the event record retrieved at block 1404 (block 1408). The fault detector 204 then adds the duration to the duration since the last location event variable (block 1410). The fault detector 204 then determines whether the duration since the last location event exceeds a threshold duration (block 1412). If the duration exceeds the threshold (block 1412), the fault detector 204 stores a missing location information event indicator in an error log file via the data file interface 206 (block 1414). After storing the missing location event indicator (block 1414) or if the duration does not exceed the threshold (block 1412), the fault detector 204 resets the duration since last location event variable (block 1416) and determines whether another event record remains to be processed (block 1418).

If another event record remains to be processed (block 1418) or if the fault detector 204 determines that the event record is not a location event (block 1406), control is passed back to block 1404. Otherwise, the example process of FIG. 14 is ended.

Figure 15:
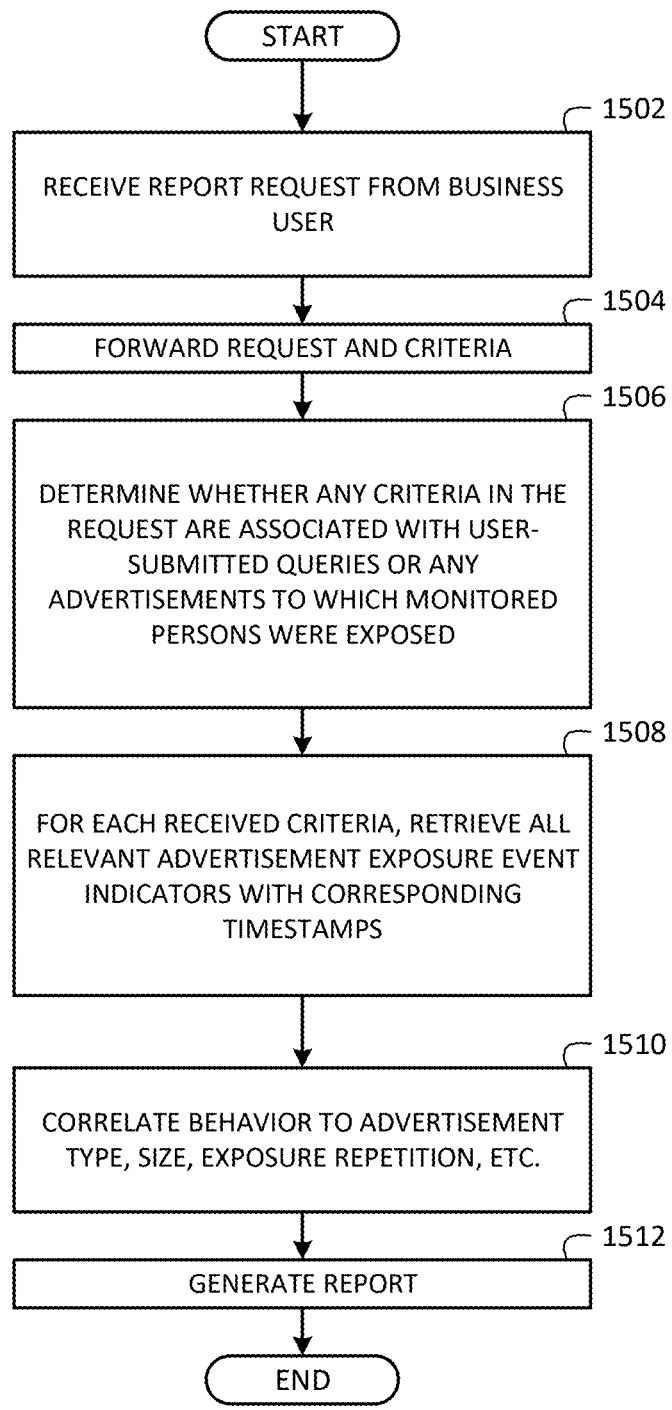
FIG. 15 is a flow diagram representative of example machine readable instructions that may be executed to answer database requests from advertisers or business users related to behaviors of monitored persons associated with advertisements and query search results.

FIG. 15 shows an example process that may be implemented by the central facility 60 to answer database requests from advertisers or business users related to behaviors of monitored persons (e.g., the monitored persons 32, 38, and 40) associated with advertisements and/or query search results. Initially, the central facility 60 receives a report request from a business user (block 1502). In the illustrated example, the inquiry requests information about the exposure to an advertisement or advertisements by a monitored person or persons and includes one or more criteria indicative of those advertisements. The request and criteria are then communicated to the analysis server 74 (FIGS. 1 and 4) (block 1504). The analysis server 74 then runs the query and determines whether any of the criteria in the received request relate to any queries submitted by a monitored person or persons and advertisements to which those monitored persons were exposed (block 1506). For example, the analysis server 74 may compare the received criteria with data in the advertisement exposure, queries, and retail establishment visits mapping data structure 628. The analysis server 74 retrieves all relevant advertisement exposure events and corresponding timestamps (block 1508) for each query made by a monitored person while within the radius of the advertisement or sometime after the monitored person was within the radius of the advertisement. The analysis server 74 then correlates behavior of the monitored person to the advertisement type, advertisement size, repetitions of exposures to the advertisement, and/or any other desired factors (block 1512). The analysis server 74 then generates a report (block 1512) using the identified data in response to the report request received from the business user.

Figure 16:
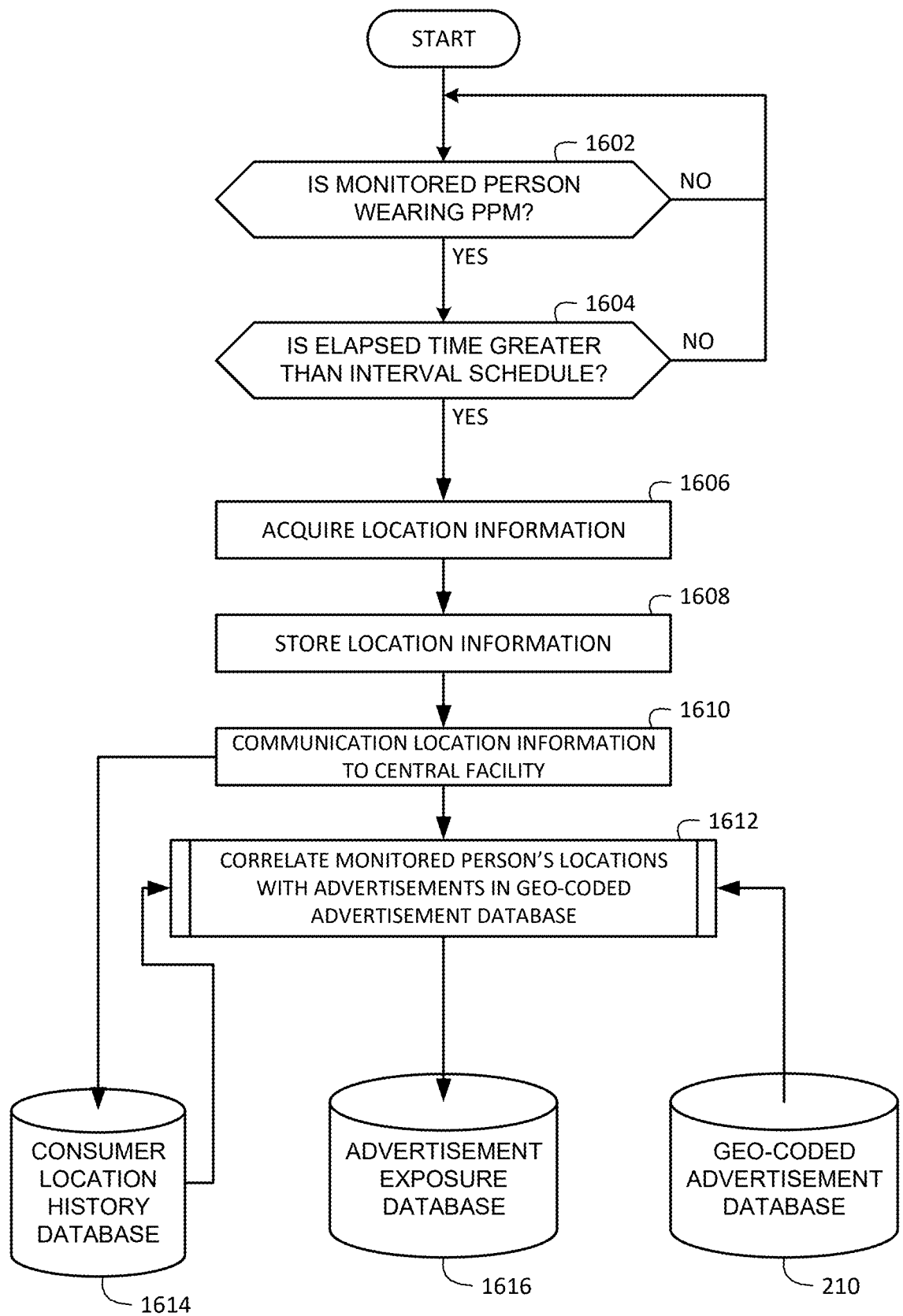
FIG. 16 is a flow diagram representative of example machine readable instructions that may be executed to determine the advertisements to which monitored persons were exposed based on data collected by the PPM of FIGS. 1-3.

FIG. 16 is an example flow diagram of a location and advertisement exposure correlation process that may be performed by the PPM 30 in the geographical area 10 of FIG. 1 and the example apparatus 200 (FIG. 4) to determine the advertisements to which the monitored person 32 was exposed. Initially, the PPM 30 determines whether the monitored person 32 is wearing the PPM 30 (block 1602). If the monitored person 32 is not wearing the PPM 30, the example process waits at block 1602 until the PPM 30 detects that the monitored person 32 is wearing the PPM 30. When the monitored person 32 is wearing the PPM 30 (block 1602), the PPM 30 determines whether a duration elapsed since the last location acquisition is greater than a scheduled interval (block 1604). If the elapsed duration is not greater than a scheduled interval (block 1604), control is passed back to block 1602. Otherwise, the location data collector 164 (FIG. 3) acquires location information (block 1606) from, for example, the location/motion sensors 110 (FIGS. 2 and 3). The location data collector 164 then stores the location information (block 1608) in, for example, the location data log file 180 (FIG. 3). The location data collector 164 then communicates the location event data from the location data log file 180 to the central facility 60 (block 1610) where it is stored in a consumer location history database 1614. The location history database 1614 may be implemented using the PPM location file 80 or may be used to store various PPM location files 80.

The example apparatus 200 can then correlate the locations of the monitored person 32 with advertisements identified in the geo-coded advertisement database 210 (block 1612) to which the monitored person 32 was likely exposed (block 1612). The process of block 1612 can be implemented using one or more of the processes described above to determine the advertisements to which the monitored person 32 was exposed. In the illustrated example, the process of block 1612 can store the correlation results in an advertisement exposure database 1616. For example, the example apparatus can store the advertisement exposure data structure 624 (FIG. 6) and/or the advertisement exposure, queries, and retail establishment visits mapping data structure 628 (FIG. 6) in the advertisement exposure database 1616.

It is to be understood that the example machine accessible instructions of the flow diagrams of FIGS. 5A, 5B, 6-9, 10A, 10B, 11A, 11B, and 12-16 may be executed by a processor, a controller and/or any other suitable processing device. For example, the example machine accessible instructions of FIGS. 5A, 5B, 6-9, 10A, 10B, 11A, 11B, and 12-16 may be embodied in coded instructions stored on a tangible medium such as a flash memory, or random access memory (RAM) associated with a processor. Alternatively, some or all of the example flow diagrams of FIGS. 5A, 5B, 6-9, 10A, 10B, 11A, 11B, and 12-16 may be implemented using an application specific integrated circuit (ASIC), a programmable logic device (PLD), a field programmable logic device (FPLD), discrete logic, hardware, firmware, etc. Also, some or all of the example flow diagrams of FIGS. 5A, 5B, 6-9, 10A, 10B, 11A, 11B, and 12-16 may be implemented manually or as combinations of any of the foregoing techniques including, for example, a combination of firmware, software and/or hardware. Further, although the example machine accessible instructions of FIGS. 5A, 5B, 6-9, 10A, 10B, 11A, 11B, and 12-16 are described with reference to the flow diagrams of FIGS. 5A, 5B, 6-9, 10A, 10B, 11A, 11B, and 12-16, persons of ordinary skill in the art will readily appreciate that many other techniques of implementing the example methods, apparatus, and systems described herein may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 5A, 5B, 6-9, 10A, 10B, 11A, 11B, and 12-16 may be carried out sequentially and/or carried out in parallel by, for example, separate processing threads, processors, devices, circuits, etc.

Figure 17:
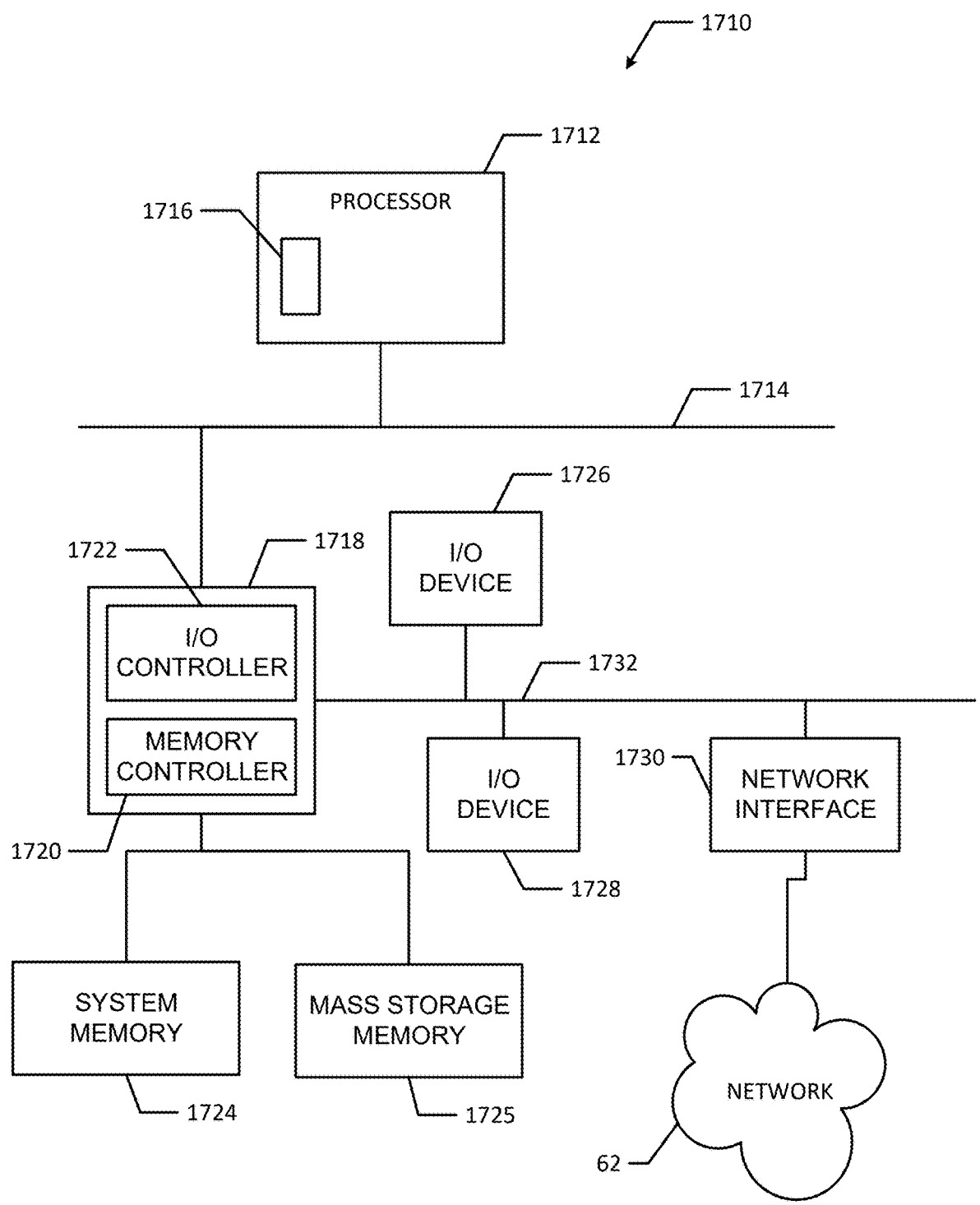
FIG. 17 is a block diagram of an example processor system that may be used to implement portions of the system of FIG. 1.

FIG. 17 is a block diagram of an example processor system 1710 that may be used to implement the methods, apparatus, and systems described herein including. As shown in FIG. 17, the processor system 1710 includes a processor 1712 that is coupled to an interconnection bus 1714. The processor 1712 includes a register set or register space 1716, which is depicted in FIG. 17 as being entirely on-chip, but which could alternatively be located entirely or partially off-chip and directly coupled to the processor 1712 via dedicated electrical connections and/or via the interconnection bus 1714. The processor 1712 may be any suitable processor, processing unit or microprocessor. Although not shown in FIG. 17, the system 1710 may be a multi-processor system and, thus, may include one or more additional processors that are identical or similar to the processor 1712 and that are communicatively coupled to the interconnection bus 1714.

The processor 1712 of FIG. 17 is coupled to a chipset 1718, which includes a memory controller 1720 and an input/output (I/O) controller 1722. As is well known, a chipset typically provides I/O and memory management functions as well as a plurality of general purpose and/or special purpose registers, timers, etc. that are accessible or used by one or more processors coupled to the chipset 1718. The memory controller 1720 performs functions that enable the processor 1712 (or processors if there are multiple processors) to access a system memory 1724 and a mass storage memory 1725.

The system memory 1724 may include any desired type of volatile and/or non-volatile memory such as, for example, static random access memory (SRAM), dynamic random access memory (DRAM), flash memory, read-only memory (ROM), etc. The mass storage memory 1725 may include any desired type of mass storage device including hard disk drives, optical drives, tape storage devices, etc.

The I/O controller 1722 performs functions that enable the processor 1712 to communicate with peripheral input/output (I/O) devices 1726 and 1728 and a network interface 1730 via an I/O bus 1732. The I/O devices 1726 and 1728 may be any desired type of I/O device such as, for example, a keyboard, a video display or monitor, a mouse, etc. The network interface 1730 is communicatively coupled to the network 62 and may be, for example, an Ethernet device, an asynchronous transfer mode (ATM) device, an 802.11 device, a DSL modem, a cable modem, a cellular modem, etc. that enables the processor system 1710 to communicate with another processor system.

While the memory controller 1720 and the I/O controller 1722 are depicted in FIG. 17 as separate functional blocks within the chipset 1718, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
    accessing a geo-coded advertisement database indicating, for a given fixed advertisement display having a fixed location, an advertisement identifier in association with:
        (i) location information indicative of the fixed location of the given fixed advertisement display, and
        (ii) a geo-fence boundary of the fixed location, the geo-fence boundary indicative of a region in which a viewer is exposed to the given fixed advertisement display;
    accessing a reference media identification database indicating, for a given television advertisement included in a television broadcast, a reference audio code representative of audio characteristics of the given television advertisement;
    obtaining from a first one of a plurality of mobile monitoring devices: (i) first media exposure information including a first series of audio codes extracted from audio characteristics of media content detected by an audio sensor of the first one of the plurality of mobile monitoring devices during a given time period; (ii) first location information indicative of a series of locations detected via a positioning sensor of the first one of the plurality of mobile monitoring devices during the given time period; and (iii) first bar code information of a first product, scanned by a bar code reader of the first one of the plurality of mobile monitoring devices, wherein the first one of the plurality of mobile monitoring devices is a cellular phone;
obtaining from a second one of the plurality of mobile monitoring devices: (i) second media exposure information including a second series of audio codes extracted from audio characteristics of media content detected by an audio sensor of the second one of the plurality of mobile monitoring devices during the given time period; (ii) second location information indicative of a series of locations detected via a positioning sensor of the second one of the plurality of mobile monitoring devices during the given time period; and (iii) second bar code information of a second product, scanned by a bar code reader of the second one of the plurality of mobile monitoring devices;
accessing a purchase information database indicating purchases of a given product including bar code information associated with the given product;
marking each of the first bar code information of the first product, scanned by the bar code reader of the first one of the plurality of mobile monitoring devices, and the second bar code information of the second product, scanned by the bar code reader of the second one of the plurality of mobile monitoring devices, as a potential purchase;
determining, using the first bar code information and the purchase information database, that a first person associated with the first one of the plurality of mobile monitoring devices purchased the given product at a first particular purchase event during the given time period;
determining, using the second bar code information and the purchase information database, that a second person associated with the second one of the plurality of mobile monitoring devices purchased the given product at a second particular purchase event during the given time period,
wherein the first product and the second product correspond to the given product associated with both the given fixed advertisement display and the given television advertisement;
updating the marking of each of the first bar code information and the second bar code information as the potential purchase to a confirmed purchase of the given product;
determining, based on a correspondence between the geo-fence boundary of the given fixed advertisement display and the first and second location information, that the first and second ones of the plurality of mobile monitoring devices were within the geo-fence boundary of the given fixed advertisement display during the given time period;
responsive to determining that the first and second ones of the plurality of mobile monitoring devices were within the geo-fence boundary of the given fixed advertisement display, crediting the given fixed advertisement display as having been exposed to both the first and second persons during the given time period;
making comparisons between the respective series of extracted audio codes of the first and second media exposure information with the reference audio code of the given television advertisement and determining, based on the comparisons, that the first series of audio codes includes the reference audio code and the second series of audio codes does not include the reference audio code;
responsive to determining that the first series of audio codes includes the reference audio code and the second series of audio codes does not include the reference audio code, crediting the given television advertisement as having been exposed to the first person and not the second person during the given time period; and
generating an exposure report for the given product during the given time period based on: (i) purchases of the given product during the given time period, flagged as confirmed purchases; (ii) the credited exposures of the given television advertisement; and (iii) the credited exposures of the given fixed advertisement display, wherein the exposure report is associated with an effectiveness of an advertisement campaign.

2. The method of claim 1, further comprising:
accessing a web event database indicating, for a given product associated with both the given fixed advertisement display and the given television advertisement, at least one search query related to the given product and a timestamp associated with an input of the at least one search query; and
based on the at least one search query related to the given product and the timestamp associated with an input of the at least one search query, accessing a purchase information database indicating, for the given product associated with both the given fixed advertisement display and the given television advertisement, purchases of the given product during a given time period, wherein the given time period is relative to a first time based on the timestamp associated with the input of the search query and a second time based on an exposure to at least one of: the given fixed advertisement display or the given television advertisement, and wherein the first time occurs after the second time,
wherein the web event database stores a first series of search queries from the first one of the plurality of mobile monitoring devices and a second series of search queries from the second one of the plurality of mobile monitoring devices;
wherein at least one of the first series of search queries or the second series of search queries include the at least one search query; and
wherein the method further comprises:
identifying particular ones of the search queries within the first and second series of search queries associated with the given product.

3. The method of claim 2, wherein each search query of the first series of the search queries stored in the web event database comprises a query string search in association with results of the search query, a timestamp, and a location identifier.

4. The method of claim 2, wherein the identified particular ones of the search queries are identified based on the search queries being submitted within a threshold extent of time of the respective one of the first and second mobile monitoring device being within the geo-fence boundary of the given fixed advertisement display.

5. The method of claim 1, wherein the exposure report of the given product includes a relative effectiveness of each of the given television advertisement and the given fixed advertisement display.

6. The method of claim 5, wherein the relative effectiveness of the given television advertisement is weighted according to the credited exposure to the first person and not the second person whereas the relative effectiveness of the given fixed advertisement display is weighted according to the credited exposure to both the first and second persons.

7. The method of claim 5, wherein the relative effectiveness of the given television advertisement is based on a television exposure recency between a first particular purchase event of the first product and the credited exposures of the first person to the given television advertisement and a fixed advertisement display recency between the first particular purchase event and the credited exposures of the first person to the given fixed advertisement display.

8. A computing system comprising:
   at least one processor;
   a non-transitory computer readable medium having stored thereon instructions that, upon execution by the at least one processor, cause the computing system to perform operations including:
      accessing a geo-coded advertisement database indicating, for a given fixed advertisement display having a fixed location, an advertisement identifier in association with:
         (i) location information indicative of the fixed location of the given fixed advertisement display, and
         (ii) a geo-fence boundary of the fixed location, the geo-fence boundary indicative of a region in which a viewer is exposed to the given fixed advertisement display;
      accessing a reference media identification database indicating, for a given television advertisement included in a television broadcast, a reference audio code representative of audio characteristics of the given television advertisement;
      obtaining from a first one of a plurality of mobile monitoring devices: (i) first media exposure information including a first series of audio codes extracted from audio characteristics of media content detected by an audio sensor of the first one of the plurality of mobile monitoring devices during a given time period; (ii) first location information indicative of a series of locations detected via a positioning sensor of the first one of the plurality of mobile monitoring devices during the given time period; and (iii) first bar code information of a first product, scanned by a bar code reader of the first one of the plurality of mobile monitoring devices,
         wherein the first one of the plurality of mobile monitoring devices is a cellular phone;
      obtaining from a second one of the plurality of mobile monitoring devices: (i) second media exposure information including a second series of audio codes extracted from audio characteristics of media content detected by an audio sensor of the second one of the plurality of mobile monitoring devices during the given time period; (ii) second location information indicative of a series of locations detected via a positioning sensor of the second one of the plurality of mobile monitoring devices during the given time period; and (iii) second bar code information of a second product, scanned by a bar code reader of the second one of the plurality of mobile monitoring devices;
      accessing a purchase information database indicating purchases of a given product including bar code information associated with the given product;
      marking each of the first bar code information of the first product, scanned by the bar code reader of the first one of the plurality of mobile monitoring devices, and the second bar code information of the second product, scanned by the bar code reader of the second one of the plurality of mobile monitoring devices, as a potential purchase;
      determining, using the first bar code information and the purchase information database, that a first person associated with the first one of the plurality of mobile monitoring devices purchased the given product at a first particular purchase event during the given time period;
      determining, using the second bar code information and the purchase information database, that a second person associated with the second one of the plurality of mobile monitoring devices purchased the given product at a second particular purchase event during the given time period,
         wherein the first product and the second product correspond to the given product associated with both the given fixed advertisement display and the given television advertisement;
      updating the marking of each of the first bar code information and the second bar code information as the potential purchase to a confirmed purchase of the given product;
      determining, based on a correspondence between the geo-fence boundary of the given fixed advertisement display and the first and second location information, that the first and second ones of the plurality of mobile monitoring devices were within the geo-fence boundary of the given fixed advertisement display during the given time period;
      responsive to determining that the first and second ones of the plurality of mobile monitoring devices were within the geo-fence boundary of the given fixed advertisement display, crediting the given fixed advertisement display as having been exposed to both the first and second persons during the given time period;
      making comparisons between the respective series of extracted audio codes of the first and second media exposure information with the reference audio code of the given television advertisement and determining, based on the comparisons, that the first series of audio codes includes the reference audio code and the second series of audio codes does not include the reference audio code;
      responsive to determining that the first series of audio codes includes the reference audio code and the second series of audio codes does not include the reference audio code, crediting the given television advertisement as having been exposed to the first person and not the second person during the given time period; and
      generating an exposure report for the given product during the given time period based on: (i) purchases of the given product during the given time period, flagged as confirmed purchases; (ii) the credited exposures of the given television advertisement; and (iii) the credited exposures of the given fixed advertisement display, wherein the exposure report is associated with an effectiveness of an advertisement campaign.

9. The computing system of claim 8, the operations further comprising:
   accessing a web event database, wherein the web event database stores a first series of search queries from a first one of a plurality of mobile monitoring devices and a second series of search queries from a second one of the plurality of mobile monitoring devices, and
   determining particular ones of the search queries within the first and second series of search queries associated with a given product for a given time period, wherein the given time period corresponds to a time period after an exposure to at least one of the given fixed advertisement display or the given television advertisement, wherein each search query of the first series of search queries from the first one of the plurality of mobile monitoring devices and each search query of the second series of search queries from the second one of the plurality of mobile monitoring devices are stored in association with search results, a corresponding timestamp, and a corresponding location identifier particular ones of the search queries within the first and second series of search queries associated with the given product.

10. The computing system of claim 9, wherein the given time period is further relative to a timestamp of a search query of the first series of search queries or the second series of search queries, and wherein the search query occurs after the exposure.

11. The computing system of claim 9, wherein at least a portion of the search queries of the first series of search queries from the first one of the plurality of mobile monitoring devices includes the bar code information of the first product.

12. The computing system of claim 9, wherein the determined particular ones of the search queries are determined based on the search queries being submitted within a threshold extent of time of the respective one of the first and second mobile monitoring device being within the geo-fence boundary of the given fixed advertisement display.

13. The computing system of claim 8, wherein the exposure report of the given product includes a relative effectiveness of each of the given television advertisement and the given fixed advertisement display.

14. The computing system of claim 13, wherein the relative effectiveness of the given television advertisement is weighted according to the credited exposure to the first person and not the second person whereas the relative effectiveness of the given fixed advertisement display is weighted according to the credited exposure to both the first and second persons.

15. The computing system of claim 9, wherein at least a portion of the search queries of the first series of search queries from the first one of the plurality of mobile monitoring devices is stored with a radio-frequency identification (RFID) code associated with the given product in the web event database.

16. A non-transitory computer-readable storage medium, having stored thereon program instructions that, upon execution by a processor, cause performance of operations comprising:
 accessing a geo-coded advertisement database indicating, for a given fixed advertisement display having a fixed location, an advertisement identifier in association with:
  (i) location information indicative of the fixed location of the given fixed advertisement display, and
  (ii) a geo-fence boundary of the fixed location, the geo-fence boundary indicative of a region in which a viewer is exposed to the given fixed advertisement display;
 accessing a reference media identification database indicating, for a given television advertisement included in a television broadcast, a reference audio code representative of audio characteristics of the given television advertisement;
 obtaining from a first one of a plurality of mobile monitoring devices: (i) first media exposure information including a first series of audio codes extracted from audio characteristics of media content detected by an audio sensor of the first one of the plurality of mobile monitoring devices during a given time period; (ii) first location information indicative of a series of locations detected via a positioning sensor of the first one of the plurality of mobile monitoring devices during the given time period; and (iii) first bar code information of a first product, scanned by a bar code reader of the first one of the plurality of mobile monitoring devices,
  wherein the first one of the plurality of mobile monitoring devices is a cellular phone;
 obtaining from a second one of the plurality of mobile monitoring devices: (i) second media exposure information including a second series of audio codes extracted from audio characteristics of media content detected by an audio sensor of the second one of the plurality of mobile monitoring devices during the given time period; (ii) second location information indicative of a series of locations detected via a positioning sensor of the second one of the plurality of mobile monitoring devices during the given time period; and (iii) second bar code information of a second product, scanned by a bar code reader of the second one of the plurality of mobile monitoring devices;
 accessing a purchase information database indicating purchases of a given product including bar code information associated with the given product;
 marking each of the first bar code information of the first product, scanned by the bar code reader of the first one of the plurality of mobile monitoring devices, and the second bar code information of the second product, scanned by the bar code reader of the second one of the plurality of mobile monitoring devices, as a potential purchase;
 determining, using the first bar code information and the purchase information database, that a first person associated with the first one of the plurality of mobile monitoring devices purchased the given product at a first particular purchase event during the given time period;
 determining, using the second bar code information and the purchase information database, that a second person associated with the second one of the plurality of mobile monitoring devices purchased the given product at a second particular purchase event during the given time period,
  wherein the first product and the second product correspond to the given product associated with both the given fixed advertisement display and the given television advertisement;
 updating the marking of each of the first bar code information and the second bar code information as the potential purchase to a confirmed purchase of the given product;
 determining, based on a correspondence between the geo-fence boundary of the given fixed advertisement display and the first and second location information, that the first and second ones of the plurality of mobile monitoring devices were within the geo-fence boundary of the given fixed advertisement display during the given time period;
 responsive to determining that the first and second ones of the plurality of mobile monitoring devices were within the geo-fence boundary of the given fixed advertisement display, crediting the given fixed advertisement display as having been exposed to both the first and second persons during the given time period;

making comparisons between the respective series of extracted audio codes of the first and second media exposure information with the reference audio code of the given television advertisement and determining, based on the comparisons, that the first series of audio codes includes the reference audio code and the second series of audio codes does not include the reference audio code;

responsive to determining that the first series of audio codes includes the reference audio code and the second series of audio codes does not include the reference audio code, crediting the given television advertisement as having been exposed to the first person and not the second person during the given time period; and generating an exposure report for the given product during the given time period based on: (i) purchases of the given product during the given time period, flagged as confirmed purchases; (ii) the credited exposures of the given television advertisement; and (iii) the credited exposures of the given fixed advertisement display, wherein the exposure report is associated with an effectiveness of an advertisement campaign.

17. The non-transitory computer-readable storage medium of claim 16, wherein the operations further comprise:

accessing a web event database, wherein the web event database stores a first series of search queries from a first one of a plurality of mobile monitoring devices and a second series of search queries from a second one of the plurality of mobile monitoring devices, and wherein each search query of the first series of search queries and the second series of search queries is stored in association with a search string, search results, a corresponding timestamp, and a corresponding location identifier; and determining particular ones of the search queries within the first and second series of search queries associated with a given product for a given time period, wherein the given time period corresponds to a time period after an exposure to at least one of the given fixed advertisement display or the given television advertisement, wherein the determined particular ones of the search queries are determined based on the search queries being submitted within a threshold extent of time of the respective one of the first and second mobile monitoring device being within the geo-fence boundary of the given fixed advertisement display.

18. The non-transitory computer-readable storage medium of claim 16, wherein the operations further include:

determining that the first one of the plurality of mobile monitoring devices is in an operational status.

19. The non-transitory computer-readable storage medium of claim 18, wherein the determining that the first one of the plurality of mobile monitoring devices is operational comprises:

receiving, from the first one of the plurality of mobile monitoring devices, a first data log at a first time, wherein the first data log includes a first operational status of the first one of the plurality of mobile monitoring devices at the first time;

storing the first data log;

receiving, from the first one of the plurality of mobile monitoring devices, a second data log at a second time, wherein the second data log includes a second operational status of the first one of the plurality of mobile monitoring devices at the second time;

storing the second data log; and determining that the first one of the plurality of mobile monitoring devices is in the operational status when second time occurred within a threshold time from the first time.

20. The non-transitory computer-readable storage medium of claim 17, wherein the given time period is further relative to a timestamp of a search query of the first series of search queries or the second series of search queries, and wherein the search query occurs after the exposures.

* * * * *